United States Patent
Kim et al.

(10) Patent No.: US 11,967,754 B2
(45) Date of Patent: Apr. 23, 2024

(54) RADIO FREQUENCY DEVICE AND ELECTRONIC APPARATUS HAVING THE SAME

(71) Applicants: SAMSUNG DISPLAY CO., LTD., Yongin-si (KR); ULSAN NATIONAL INSTITUTE OF SCIENCE AND TECHNOLOGY, Ulsan (KR)

(72) Inventors: Jae-Kyoung Kim, Hwaseong-si (KR); WonSang Park, Yongin-si (KR); Gangil Byun, Ulsan (KR); Jinmyeong Heo, Suwon-si (KR)

(73) Assignees: SAMSUNG DISPLAY CO., LTD., Yongin-si (KR); UNIST (ULSAN NATIONAL INSTITUTE OF SCIENCE AND TECHNOLGY), Ulsan (KR)

( * ) Notice: Subject to any disclaimer, the term of this patent is extended or adjusted under 35 U.S.C. 154(b) by 268 days.

(21) Appl. No.: 17/028,124

(22) Filed: Sep. 22, 2020

(65) Prior Publication Data
US 2021/0135340 A1  May 6, 2021

(30) Foreign Application Priority Data
Oct. 31, 2019 (KR) .................. 10-2019-0137946

(51) Int. Cl.
*H01Q 1/24* (2006.01)
*H01Q 9/04* (2006.01)
*H04M 1/02* (2006.01)

(52) U.S. Cl.
CPC ............ *H01Q 1/245* (2013.01); *H01Q 1/243* (2013.01); *H01Q 9/045* (2013.01); *H04M 1/0269* (2022.02)

(58) Field of Classification Search
CPC .......... H01Q 1/243; H01Q 1/44; H01Q 9/045; H01Q 1/38; G06F 3/041; H04M 2250/22
See application file for complete search history.

(56) References Cited

U.S. PATENT DOCUMENTS

| 5,872,542 A | 2/1999 | Simons et al. |
| 10,381,750 B2 | 8/2019 | Jung et al. |
| (Continued) | | |

FOREIGN PATENT DOCUMENTS

| EP | 2369674 | 9/2011 |
| EP | 3968459 | 3/2022 |
| (Continued) | | |

OTHER PUBLICATIONS

Extended European Search Report dated Mar. 26, 2021 in corresponding European Application No. 20203779.2 (12 pages).
(Continued)

*Primary Examiner* — Ab Salam Alkassim, Jr.
*Assistant Examiner* — Anh N Ho
(74) *Attorney, Agent, or Firm* — F. CHAU & ASSOCIATES, LLC

(57) ABSTRACT

The present disclosure relates to an electronic apparatus. The electronic apparatus includes a display panel in which an active area and a peripheral area are defined and an antenna with at least a portion overlapping the active area. The antenna includes a first pattern portion having a first characteristic impedance and a first mesh structure, a second pattern portion, and a third pattern portion. The second pattern portion is disposed adjacent to the first pattern portion and has a second characteristic impedance different from the first characteristic impedance and a second mesh structure. The third pattern portion is disposed adjacent to the second pattern portion and has a third characteristic impedance different from the second characteristic imped- (Continued)

ance and a third mesh structure. The second characteristic impedance has a value between the first characteristic impedance and the third characteristic impedance.

28 Claims, 20 Drawing Sheets

(56) References Cited

U.S. PATENT DOCUMENTS

| | | | |
|---|---|---|---|
| 2009/0051620 A1 | 2/2009 | Ishibashi et al. | |
| 2015/0255856 A1* | 9/2015 | Hong | H01Q 21/061 |
| | | | 343/702 |
| 2016/0134008 A1* | 5/2016 | Kim | H01Q 1/1271 |
| | | | 343/711 |
| 2016/0190678 A1 | 6/2016 | Hong et al. | |
| 2016/0344089 A1* | 11/2016 | Baik | H01Q 1/273 |
| 2020/0067176 A1 | 2/2020 | Kim et al. | |
| 2020/0403301 A1* | 12/2020 | Ryu | H01Q 1/364 |
| 2022/0029278 A1* | 1/2022 | Ryu | G09F 9/00 |
| 2022/0201838 A1* | 6/2022 | Suzuki | H05K 3/18 |

FOREIGN PATENT DOCUMENTS

| | | | | |
|---|---|---|---|---|
| JP | 2017182214 A | * | 10/2017 | ............. G06F 3/041 |
| KR | 10-2009-0041768 | | 4/2009 | |
| KR | 10-2016-0080444 | | 7/2016 | |
| KR | 10-2018-0071610 | | 6/2018 | |
| KR | 10-2019-0019802 | | 2/2019 | |
| KR | 10-2019-0071411 | | 6/2019 | |
| KR | 10-2000121 | | 7/2019 | |
| KR | 102099830 B1 | * | 4/2020 | ........... G06F 3/0416 |
| WO | WO-2006106982 A1 | * | 10/2006 | ............. H01Q 1/243 |
| WO | 2011089219 | | 7/2011 | |
| WO | WO-2011089219 A1 | * | 7/2011 | ........... H01Q 1/1278 |
| WO | 2018159926 | | 9/2018 | |
| WO | WO-2018159926 A1 | * | 9/2018 | ......... G06F 3/04182 |
| WO | 2019177382 | | 9/2019 | |
| WO | WO-2020071679 A1 | * | 4/2020 | ............. G06F 3/041 |

OTHER PUBLICATIONS

Saturn PCB Design, Inc., "915MHz Patch Antenna", 2 pages.
Journal of the Korean Electromagnetic Engineering Society Summer Conference, vol. 1, No. 1 Aug. 22-24, 2019, in Korean, 1 page.
Park, et al., "An Optically Invisible Antenna-on-Display Concept for Millimeter-Wave 5G Cellular Devices", IEEE Transactions on Antennas and Propagation, vol. 67, No. 5, May 2019, pp. 2942-2952.
Green, et al., "Optically Transparent Antennas and Filters", IEEE Antennas & Propagation Magazine, Jun. 2019, pp. 37-47.

* cited by examiner

RADIO FREQUENCY DEVICE AND ELECTRONIC APPARATUS HAVING THE SAME

CROSS-REFERENCE TO RELATED APPLICATION

This U.S. non-provisional patent application claims priority under 35 U.S.C. § 119 of Korean Patent Application No. 10-2019-0137946, filed on Oct. 31, 2019, the contents of which are incorporated by reference herein in its entirety.

BACKGROUND

1. Field of Disclosure

The present disclosure relates to a radio frequency device with an increased antenna efficiency and an electronic apparatus including the radio frequency device.

2. Description of the Related Art

An electronic apparatus includes electronic modules. For example, the electronic apparatus is a portable terminal or a wearable device, and the electronic modules include an antenna module, a camera module, or a battery module. The electronic apparatus becomes highly functional and is developed to high-quality specifications, the number of electronic modules included in the electronic apparatus is increasing. However, as the portable terminal becomes thinner and the wearable device becomes smaller, a space in which the electronic modules are mounted is gradually decreasing.

SUMMARY

The present disclosure provides a radio frequency device having an increased antenna efficiency, and an electronic apparatus including the radio frequency device.

Embodiments of the inventive concept include an electronic apparatus including a display panel with an active area and a peripheral area and an antenna whose at least portion overlaps the active area. The antenna includes a first pattern portion having a first characteristic impedance and a first mesh structure, a second pattern portion disposed adjacent to the first pattern portion and having a second characteristic impedance different from the first characteristic impedance and a second mesh structure, and a third pattern portion disposed adjacent to the second pattern portion and having a third characteristic impedance different from the second characteristic impedance and a third mesh structure. The second characteristic impedance has a value between the first characteristic impedance and the third characteristic impedance.

The first pattern portion, the second pattern portion, and the third pattern portion are sequentially arranged in a first direction, a first width of the first pattern portion in a second direction crossing the first direction is greater than a second width of the second pattern portion in the second direction, and a third width of the third pattern portion in the second direction is greater than the second width.

The first pattern portion is provided with a first opening having a first size, the second pattern portion is provided with a second opening having a second size, and the third pattern portion is provided with a third opening having a third size equal to the second size.

The first pattern portion, the second pattern portion, and the third pattern portion are sequentially arranged in the first direction, a first number of the first openings arranged in the first pattern portion along the second direction crossing the first direction is greater than a second number of the second openings arranged in the second pattern portion along the second direction, and a third number of the third openings arranged in the third pattern portion along the second direction is greater than the second number and smaller than the first number.

The first pattern portion, the second pattern portion, and the third pattern portion are sequentially arranged in the first direction, a first width of the first pattern portion in the second direction crossing the first direction is greater than a second width of the second pattern portion in the second direction, and a third width of the third pattern portion in the second direction is equal to the second width.

The first pattern portion is provided with a first opening having a first size, the second pattern portion is provided with a second opening having a second size different from the first size, and the third pattern portion is provided with a third opening having a third size different from the second size.

The first pattern portion, the second pattern portion, and the third pattern portion are sequentially arranged in the first direction, and, a width of the second opening in the second direction, and a width of the third opening in a second direction crossing the first direction are equal to each other. A width of the second opening in the first direction may be greater than a width of the third opening in the first direction.

The first pattern portion, the second pattern portion, and the third pattern portion are sequentially arranged in the first direction, and a ratio of a width in the first direction to a width in the second direction crossing the first direction of the first opening, a ratio of a width in the first direction to a width in the second direction of the second opening, and a ratio of a width in the first direction to a width in the second direction of the third opening are equal to each other.

A number of the second openings arranged in the second pattern portion along the second direction is smaller than a number of the third openings arranged in the third pattern portion along the second direction. A number of the second openings arranged in the second pattern portion along the second direction is equal to a number of the third openings arranged in the third pattern portion along the second direction. A width of a line pattern of the second pattern portion is smaller than a width of a line pattern of the third pattern portion.

The first pattern portion includes a first line pattern that defines a first opening, the second pattern portion includes a second line pattern that defines a second opening, the third pattern portion includes a third line pattern that defines a third opening, and the first line pattern, the second line pattern, and the third line pattern have a same minimum width. The first pattern portion is a radiation portion that radiates a signal, and the first pattern portion overlaps the active area.

The first pattern portion, the second pattern portion, and the third pattern portion are sequentially arranged in the first direction, each of the first pattern portion, the second pattern portion, and the third pattern portion includes an opening having a rhombus or lozenge shape with a first diagonal line parallel to the first direction and a second diagonal line parallel to the second direction crossing the first direction.

The electronic apparatus further includes an input sensor disposed between the display panel and the antenna and provided with a sensing area, and the sensing area has a size equal to or smaller than a size of the active area. The electronic apparatus further includes an input sensor disposed on the display panel and including a base insulating layer and a sensing electrode disposed on the base insulating layer, and the first pattern portion, the second pattern portion, and the third pattern portion are disposed on a same layer as the sensing electrode.

The input sensor includes a sensing area in which the sensing electrode is disposed and an antenna area in which the first pattern portion, the second pattern portion, and the third pattern portion are disposed, and the sensing area and the antenna area overlap the active area. The input sensor further includes a dummy electrode disposed on the base insulating layer, and the dummy electrode is disposed adjacent to the antenna area and overlaps the active area. The input sensor further includes a dummy area in which the dummy electrode is disposed, and the antenna area, the sensing area, and the dummy area overlap the active area. The sensing electrode includes a sensing pattern patterned to correspond to a shape of the first pattern portion.

Embodiments of the inventive concept include a radio frequency device including a base layer, a first pattern portion disposed on the base layer, having a first characteristic impedance, and provided with a first opening, a second pattern portion disposed on the base layer, disposed adjacent to the first pattern portion, having a second characteristic impedance different from the first characteristic impedance, and provided with a second opening, and a third pattern portion disposed on the base layer, disposed adjacent to the second pattern portion, having a third characteristic impedance different from the second characteristic impedance, and provided with a third opening. The second characteristic impedance has a value between the first characteristic impedance and the third characteristic impedance.

A first size of the first opening, a second size of the second opening, and a third size of the third opening are equal to each other. Additionally or alternatively, a first size of the first opening is different from a second size of the second opening, and a third size of the third opening is different from the second size. A width of a line pattern of the first pattern portion, a width of a line pattern of the second pattern portion, and a width of a line pattern of the third pattern portion are equal to each other. Additionally or alternatively, a width of a line pattern of the second pattern portion is smaller than a width of a line pattern of the third pattern portion.

The first pattern portion, the second pattern portion, and the third pattern portion are sequentially arranged in the first direction, a first width of the first pattern portion in the second direction crossing the first direction is greater than a second width of the second pattern portion in the second direction, and a third width of the third pattern portion in the second direction is greater than the second width.

The first pattern portion, the second pattern portion, and the third pattern portion are sequentially arranged in the first direction, a first width of the first pattern portion in the second direction crossing the first direction is greater than a second width of the second pattern portion in the second direction, and a third width of the third pattern portion in the second direction is equal to the second width.

According to certain embodiments, the antenna includes the pattern portions each having the characteristic impedance. The pattern portions have the mesh structure, and the characteristic impedance of each pattern portion may be controlled by changing the shape of the mesh structure. For example, the characteristic impedance of the pattern portion disposed at an intermediate position is designed to have the value between the characteristic impedances of the pattern portions disposed at both ends. In this case, a reflective loss due to the change of the characteristic impedance may be reduced. As the reflective loss is reduced, the antenna efficiency may be increased.

BRIEF DESCRIPTION OF THE DRAWINGS

The above and other advantages of the present disclosure will become readily apparent by reference to the following detailed description when considered in conjunction with the accompanying drawings wherein.

DETAILED DESCRIPTION

Figure 1:
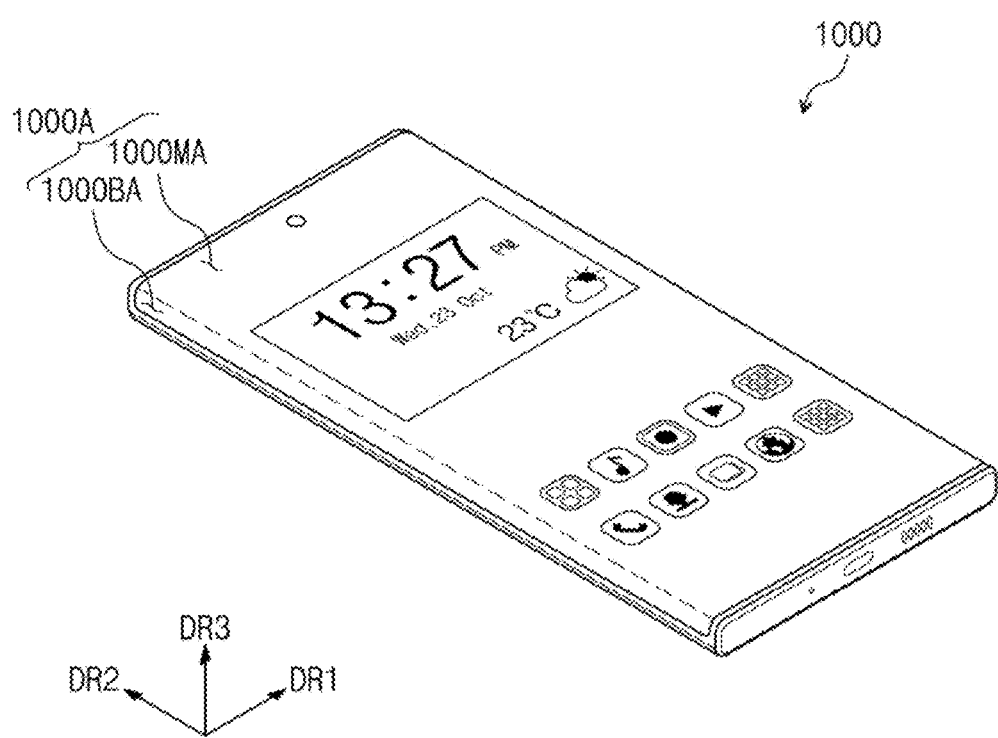
FIG. 1 is a perspective view showing an electronic apparatus according to an embodiment of the present disclosure.

The present disclosure relates to radio frequency devices. Embodiments of the present disclosure include a radio frequency device with an increased antenna efficiency. A variety of electronic devices may include an antenna device. As portable devices becomes thinner and smaller, and the number of electronic modules in the devices grows larger, the space in which antennas are mounted decreases. As the size of the antenna decreases, it becomes more important for the antenna to operate efficiently.

In some cases, antenna efficiency can be reduced due to reflective loss that occurs at a transition between different antenna elements with different characteristic impedance. Therefore, according to embodiments of the present disclosure, an antenna device includes one or more pattern portions, each having a unique impedance. The pattern portions may have a mesh structure, and the impedance of each pattern portion may be controlled or adjusted by changing a shape or pattern of the mesh structure.

For example, the characteristic impedances may be controlled by adjusting the width of different pattern portions of the antenna. Additionally or alternatively, the impedances may be controlled or adjusted by adjusting the size of openings of the pattern portions of the antenna. Additionally or alternatively, the impedance may be controlled or adjusted by adjusting the thickness of the line pattern of the antenna. As a result, reflective loss due to a change in the impedance at the interface between different mesh patterns may be reduced. As the reflective loss is reduced, the antenna efficiency may be improved.

In the present disclosure, it will be understood that when an element or layer is referred to as being "on", "connected to" or "coupled to" another element or layer, the element or layer can be directly on, connected or coupled to the other element or layer or intervening elements or layers may be present. Like numerals refer to like elements throughout. In the drawings, the thickness, ratio, and dimension of components are exaggerated for an effective description of the technical content. As used herein, the term "and/or" includes any and all combinations of one or more of the associated listed items.

It will be understood that, although the terms "first", "second", etc. may be used herein to describe various elements, components, regions, layers and/or sections, these elements, components, regions, layers and/or sections is not limited by these terms. These terms are only used to distinguish one element, component, region, layer or section from another element, component, region, layer or section. Therefore, a first element, component, region, layer or section discussed below could be termed a second element, component, region, layer or section without departing from the teachings of the present disclosure. As used herein, the singular forms, "a", "an" and "the" are intended to include the plural forms as well, unless the context clearly indicates otherwise.

Spatially relative terms, such as "beneath", "below", "lower", "above", "upper" and the like, may be used herein for ease of description to describe one element or feature's relationship to another element(s) or feature(s) as illustrated in the figures. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning consistent with the term's meaning in the context of the relevant art and will not be interpreted in an idealized or overly formal sense unless expressly so defined herein.

It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Hereinafter, the present disclosure will be explained in detail with reference to the accompanying drawings.

FIG. 1 is a perspective view showing an electronic apparatus 1000 according to an embodiment of the present disclosure.

Referring to FIG. 1, the electronic apparatus 1000 may be an apparatus activated in response to an electrical signal. For example, the electronic apparatus 1000 may be a mobile phone, a tablet computer, a car navigation unit, a game unit, or a wearable unit, however, the electronic apparatus 1000 is not limited thereto or thereby. FIG. 1 shows the mobile phone as a representative example of the electronic apparatus 1000.

The electronic apparatus 1000 may display an image through an active area 1000A. The active area 1000A may include a first display surface 1000MA substantially parallel to a plane defined by a first direction DR1 and a second direction DR2 and a second display surface 1000BA bent from the first display surface 1000MA.

The second display surface 1000BA may be bent from one side of the first display surface 1000MA. The second display surface 1000BA may be provided in a plural number. In this case, the second display surface 1000BA may be bent from at least two sides of the first display surface 1000MA. The active area 1000A may include one first display surface 1000MA and one or more and four or less second display surfaces 1000BA. However, the shape of the active area 1000A is not limited thereto or thereby, and the active area 1000A may include the first display surface 1000MA.

A thickness direction of the electronic apparatus 1000 may be substantially parallel to a third direction DR3 crossing the first direction DR1 and the second direction DR2. Accordingly, front (or upper) and rear (or lower) surfaces of each member of the electronic apparatus 1000 may be defined with respect to the third direction DR3.

Figure 2:
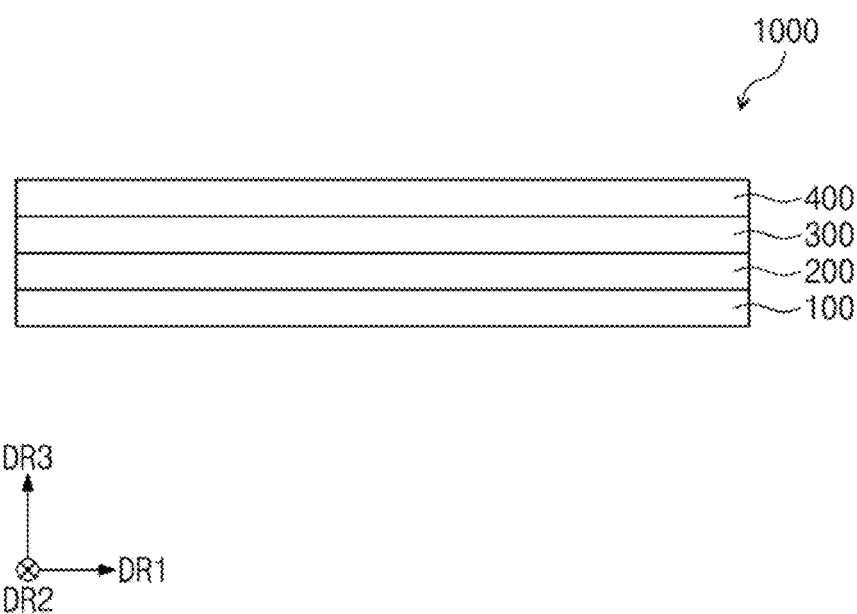
FIG. 2 is a cross-sectional view showing an electronic apparatus according to an embodiment of the present disclosure.

FIG. 2 is a cross-sectional view showing the electronic apparatus 1000 according to an embodiment of the present disclosure.

Referring to FIG. 2, the electronic apparatus 1000 may include a display panel 100, an input sensor 200, an antenna 300, and a window 400.

The display panel 100 may substantially generate the image. The display panel 100 may be a light-emitting type display panel. For example, the display panel 100 may be an organic light-emitting display panel or a quantum dot light-emitting display panel. Additionally or alternatively, the display panel 100 may be a light receiving type display panel. For example, the display panel 100 may be a liquid crystal display panel.

The input sensor 200 may be disposed on the display panel 100. The input sensor 200 may sense an external input applied thereto from the outside. The external input may be a user input. The user input may include a variety of external inputs, such as a part of user's body, light, heat, pen, or pressure.

The input sensor 200 may be formed on the display panel 100 through successive processes. Additionally or alternatively, the input sensor 200 may be coupled to the display panel 100 by an adhesive member. The adhesive member may include a conventional adhesive or a pressure-sensitive adhesive. The adhesive member may be a transparent adhesive member, such as a pressure-sensitive adhesive (PSA) film, an optically clear adhesive (OCA) film, or an optically clear resin (OCR), but the adhesive member is not limited thereto.

The antenna 300 may be disposed on the input sensor 200. The antenna 300 may transmit, receive, or both transmit and receive a wireless communication signal, for example, a radio frequency signal. The antenna 300 may be referred to as a "radio frequency device". The antenna 300 may include a plurality of radiation portions. Additionally or alternatively, the radiation portions may transmit, receive, or both transmit and receive the same frequency band as each other or may transmit, receive, or both transmit and receive different frequency bands from each other.

The antenna 300 may be provided in the active area 1000A (refer to FIG. 1). Although the electronic apparatus 1000 becomes thinner or decreases in size, or a peripheral area of the active area 1000A (refer to FIG. 1) is reduced, a space in which the antenna 300 is disposed may be obtained since a size of the active area 1000A (refer to FIG. 1) is secured.

The window 400 may be disposed on the antenna 300. The window 400 may include an optically transparent insulating material. For example, the window 400 may include a glass or plastic material. The window 400 may have a single-layer or multi-layer structure. As an example, the window 400 may include a plurality of plastic films attached to each other by an adhesive. The window 400 may also include a glass substrate and a plastic film attached to the glass substrate by an adhesive.

In FIG. 2, the antenna 300 is disposed between the input sensor 200 and the window 400, however, the antenna 300 is not limited thereto or thereby. For example, the antenna 300 may be disposed between the input sensor 200 and the display panel 100.

Figure 3:
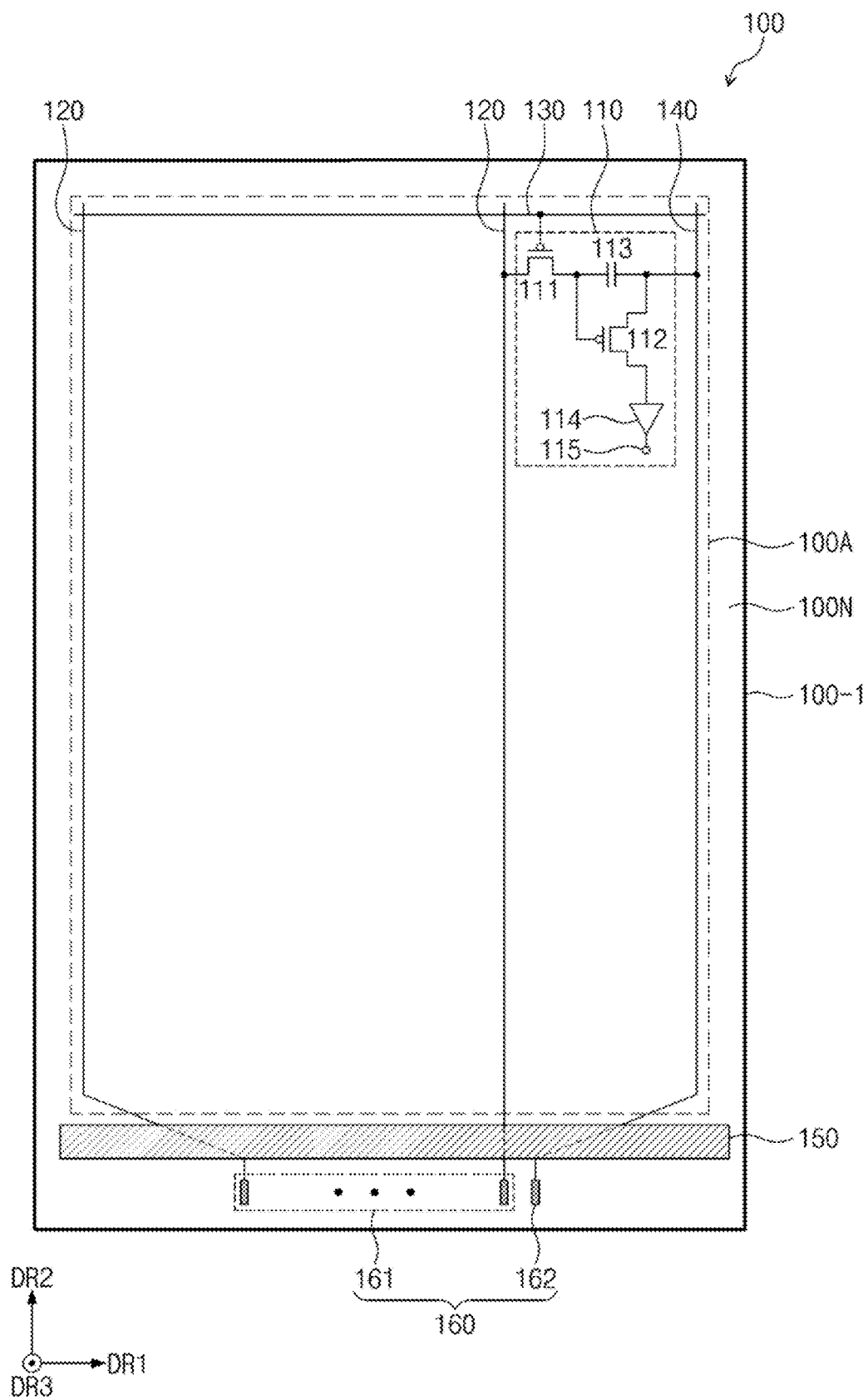
FIG. 3 is a plan view showing a display panel according to an embodiment of the present disclosure.

FIG. 3 is a plan view showing the display panel 100 according to an embodiment of the present disclosure.

Referring to FIG. 3, the display panel 100 may include an active area 100A and a peripheral area 100N. The active area 100A may be activated in response to electrical signals. For example, the active area 100A may display an image. The peripheral area 100N may surround the active area 100A. A driving circuit or a driving line may be disposed in the peripheral area 100N to drive the active area 100A.

The display panel 100 may include a base layer 100-1, a plurality of pixels 110, a plurality of signal lines 120, 130, and 140, a power pattern 150, and a plurality of display pads 160.

The base layer 100-1 may include a synthetic resin layer. A synthetic resin layer may include a heat-curable resin. The base layer 100-1 may have a multi-layer structure. For example, the base layer 100-1 may have a three-layer structure of a synthetic resin layer, an adhesive layer, and a synthetic resin layer. The synthetic resin layer may include at least one of a polyimide-based resin, an acrylic-based resin, a methacrylic-based resin, a polyisoprene, a vinyl-based resin, an epoxy-based resin, a urethane-based resin, a cellulose-based resin, a siloxane-based resin, a polyamide-based resin, and a perylene-based resin, however, the synthetic resin layer is not particularly limited. Further, the base layer 100-1 may include a glass substrate or an organic/inorganic composite substrate.

The signal lines 120, 130, and 140 may be electrically connected to the pixels 110 and may transmit electrical signals to the pixels 110. In FIG. 3, the signal lines 120, 130, and 140 may include a data line 120, a scan line 130, and a power line 140 as a representative example, however, this is merely exemplary. The signal lines 120, 130, and 140 may further include at least one of an initialization voltage line and a light-emitting control line, however, the signal lines 120, 130, and 140 is not particularly limited.

The pixels 110 may be arranged in the active area 100A. In the present embodiment, as a representative example, an equivalent circuit diagram of one pixel 110 is enlarged and shown. The pixel 110 may include a first transistor 111, a second transistor 112, a capacitor 113, and a light-emitting element 114. The first transistor 111 may be a switching device that controls an on-off of the pixel 110. The first transistor 111 may transmit or block a data signal applied through the data line 120 in response to a scan signal applied thereto through the scan line 130.

The capacitor 113 may be connected to the first transistor 111 and the power line 140. The capacitor 113 may be charged with an electric charge by an amount corresponding to a in electric charge difference between the data signal provided from the first transistor 111 and a first power signal applied to the power line 140.

The second transistor 112 may be connected to the first transistor 111, the capacitor 113, and the light-emitting element 114. The second transistor 112 may control a driving current flowing through the light-emitting element 114 in response to the amount of the electric charge charged in the capacitor 113. A turn-on time of the second transistor 112 may be determined depending on the amount of the electric charge charged in the capacitor 113. The second transistor 112 may provide the first power signal provided through the power line 140 to the light-emitting element 114 during its turn-on time.

The light-emitting element 114 may generate light or may control an amount of the light in response to an electrical signal. For example, the light-emitting element 114 may include an organic light-emitting element or a quantum dot light-emitting element.

The light-emitting element 114 may be connected to a power terminal 115 and may receive a power signal (hereinafter, referred to as a "second power signal") different from the first power signal provided from the power line 140. The driving current corresponding to a power signal difference between an electrical signal provided from the second transistor 112 and the second power signal may flow through the light-emitting element 114, and the light-emitting element 114 may generate the light corresponding to the driving current. Meanwhile, this is merely exemplary, and the pixel 110 may include electronic devices with various configurations and arrangements, and the driving current is not particularly limited.

The power pattern 150 may be disposed in the peripheral area 100N. The power pattern 150 may be electrically connected to the power lines 140. As the display panel 100 includes the power pattern 150, the first power signal with substantially the same level may be provided to the plurality of pixels 110.

The display pads 160 may include a first pad 161 and a second pad 162. The first pad 161 may be provided in a plural number, and the first pads 161 may be respectively connected to the data lines 120. The second pad 162 may be connected to the power pattern 150 and may be electrically connected to the power line 140. The display panel 100 may provide electrical signals provided from the outside through the display pads 160 to the pixels 110. Meanwhile, the display pads 160 may further include other pads to receive other electrical signals, in addition to the first pad 161 and the second pad 162, and is not particularly limited.

Figure 4:
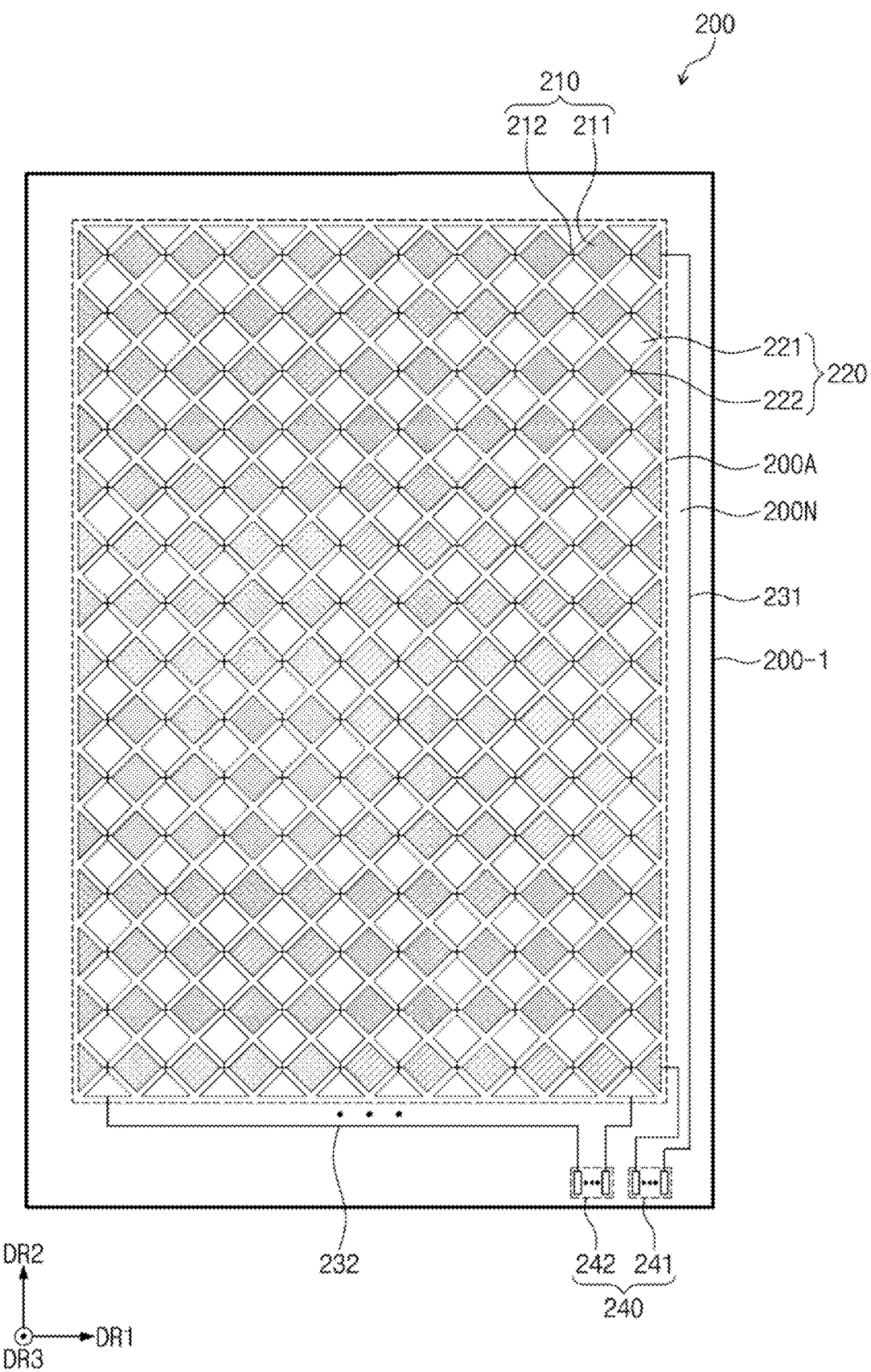
FIG. 4 is a plan view showing an input sensor according to an embodiment of the present disclosure.

FIG. 4 is a plan view showing the input sensor 200 according to an embodiment of the present disclosure.

Referring to FIG. 4, the input sensor 200 may include a sensing area 200A and a peripheral area 200N. The sensing area 200A may be activated in response to electrical signals. For example, the sensing area 200A may be an area to sense an input. A size of the sensing area 200A may be equal to or smaller than the size of the active area 100A (refer to FIG.

3) of the display panel 100 (refer to FIG. 3). The peripheral area 200N may surround the sensing area 200A.

The input sensor 200 may include a base insulating layer 200-1, first sensing electrodes 210, second sensing electrodes 220, sensing lines 231 and 232, and sensing pads 240. The first sensing electrodes 210 and the second sensing electrodes 220 may be disposed in the sensing area 200A. The sensing lines 231 and 232 and sensing pads 240 may be disposed in the peripheral area 200N.

The base insulating layer 200-1 may be an inorganic layer that includes one of silicon nitride, silicon oxynitride, and silicon oxide. Additionally or alternatively, the base insulating layer 200-1 may be an organic layer that includes an epoxy resin, an acrylic resin, or an imide-based resin. The base insulating layer 200-1 may be formed directly on the display panel 100 (refer to FIG. 2). Additionally or alternatively, the base insulating layer 200-1 may be one component of the display panel 100 (refer to FIG. 2). Additionally or alternatively, the base insulating layer 200-1 may be formed on a separate base layer, and the base layer may be coupled to the display panel 100 (refer to FIG. 2) by an adhesive member.

The input sensor 200 may obtain information about the external input based on a variation in capacitance between the first sensing electrodes 210 and the second sensing electrodes 220.

Each of the first sensing electrodes 210 may extend in the first direction DR1, and the first sensing electrodes 210 may be arranged in the second direction DR2. The first sensing electrodes 210 may include first sensing patterns 211 and first connection patterns 212. The first connection patterns 212 may electrically connect two first sensing patterns 211 adjacent to each other.

Each of the second sensing electrodes 220 may extend in the second direction DR2, and the second sensing electrodes 220 may be arranged in the first direction DR1. The second sensing electrodes 220 may include second sensing patterns 221 and second connection patterns 222. The second connection patterns 222 may electrically connect two second sensing patterns 221 adjacent to each other.

The sensing lines 231 and 232 may include first sensing lines 231 and second sensing lines 232. The first sensing lines 231 may be electrically and respectively connected to the first sensing electrodes 210. The second sensing lines 232 may be electrically and respectively connected to the second sensing electrodes 220.

The sensing pads 240 may include first sensing pads 241 and second sensing pads 242. The first sensing pads 241 may be respectively connected to the first sensing lines 231. The second sensing pads 242 may be respectively connected to the second sensing lines 232.

Figure 5:
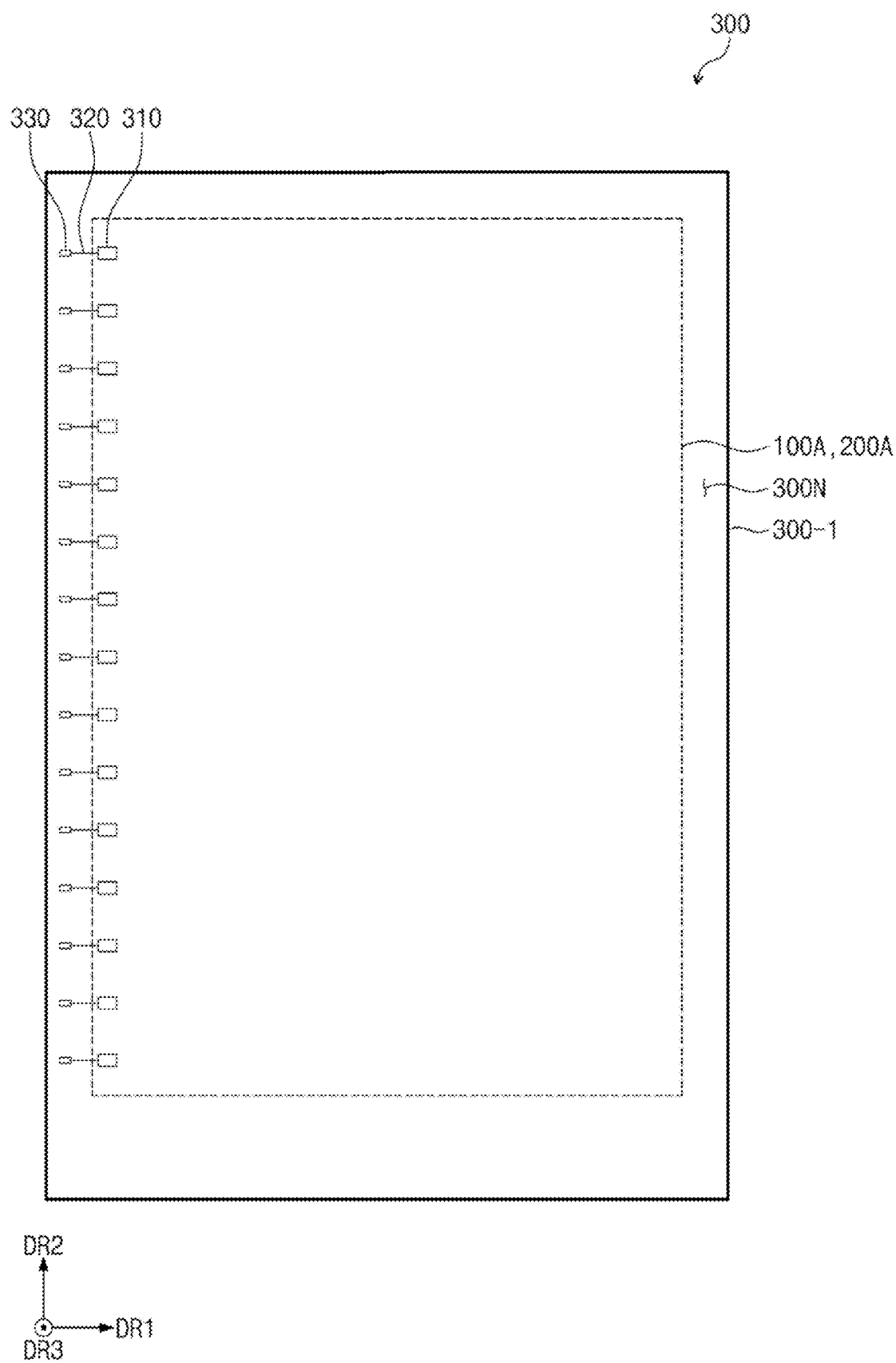
FIG. 5 is a plan view showing an antenna according to an embodiment of the present disclosure.

FIG. 5 is a plan view showing the antenna 300 according to an embodiment of the present disclosure.

Referring to FIG. 5, the antenna 300 may include a base layer 300-1, a radiation portion 310, a connection portion 320, and a pad portion 330.

The base layer 300-1 may be referred to as a "dielectric layer". The base layer 300-1 may include an insulating material with a predetermined dielectric constant. The base layer 300-1 may include a light-transmissive film. For example, the base layer 300-1 may include at least one of an acrylic-based resin, a methacrylic-based resin, a polyisoprene, a vinyl-based resin, an epoxy-based resin, a urethane-based resin, a cellulose-based resin, a siloxane-based resin, a polyamide-based resin, and a perylene-based resin, but the base layer 300-1 is not limited thereto.

The radiation portion 310, the connection portion 320, and the pad portion 330 may be disposed on the base layer 300-1. The antenna 300 may further include a ground electrode disposed under the base layer 300-1.

At least a portion of the antenna 300 may be disposed to overlap the active area 100A of the display panel 100 (refer to FIG. 3). For example, the radiation portion 310 of the antenna 300 may be disposed to overlap the active area 100A of the display panel 100 (refer to FIG. 3). The radiation portion 310 may have a mesh structure such that the image provided through the active area 100A transmits through the radiation portion 310. The mesh structure may mean a structure in which a plurality of openings is defined through a predetermined layer. In addition, the mesh structure may be referred to as a lattice structure. The radiation portion 310 may be changed to a variety of shapes in an area overlapping the active area 100A, and a design freedom of the radiation portion 310 may be increased.

The size of the active area 100A of the display panel 100 (refer to FIG. 3) may be substantially the same as the size of the sensing area 200A of the input sensor 200 (refer to FIG. 4). In this case, the radiation portion 310 may overlap the sensing area 200A of the input sensor 200 (refer to FIG. 4).

Different from FIG. 5, the size of the sensing area 200A of the input sensor 200 (refer to FIG. 4) may be smaller than the size of the active area 100A of the display panel 100 (refer to FIG. 3). In this case, the sensing area 200A of the input sensor 200 (refer to FIG. 4) may be defined as an area that does not overlap the radiation portion 310. For example, portions of the first and second sensing electrodes 210 and 220 (refer to FIG. 4) may be omitted from the area in which the radiation portion 310 is disposed.

The connection portion 320 may include the same material as the radiation portion 310 and may be formed through the same process as the radiation portion 310. The connection portion 320 may extend from the radiation portion 310 to the peripheral area 300N. The peripheral area 300N may mean an area that does not overlap the active area 100A.

The radiation portion 310 and the connection portion 320 may include a conductive material. For example, the radiation portion 310 and the connection portion 320 may include a carbon nanotube, a metal material, a metal alloy, or composites thereof and may have a single-layer or multi-layer structure. For example, the metal material may be silver (Ag), copper (Cu), aluminum (Al), gold (Au), or platinum (Pt), however, the metal material is not limited thereto or thereby.

The pad portion 330 may be electrically connected to the connection portion 320. The pad portion 330 may be disposed in the peripheral area 300N. The pad portion 330 may be electrically connected to a circuit board. The radiation portion 310 may be electrically connected to the circuit board through the connection portion 320 and the pad portion 330.

The antenna 300 may further include a dummy pattern disposed to overlap the active area 100A. The dummy pattern may be spaced apart from the radiation portion 310 and may have the same structure as the radiation portion 310. For example, both the dummy pattern and the radiation portion 310 may have the mesh structure. As the dummy pattern is disposed in the area in which the radiation portion 310 is not disposed, a difference in reflectance between the area in which the radiation portion 310 is disposed and the area in which the radiation portion 310 is not disposed may be reduced. Accordingly, the radiation portion 310 may be prevented from being viewed from the outside.

Figure 6:
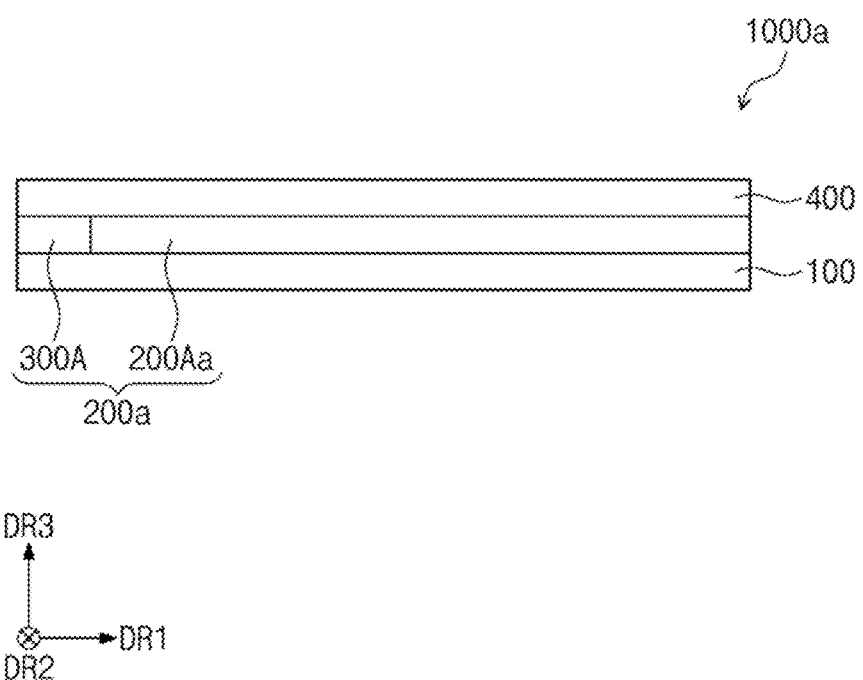
FIG. 6 is a cross-sectional view showing an electronic apparatus according to an embodiment of the present disclosure.
Figure 7:
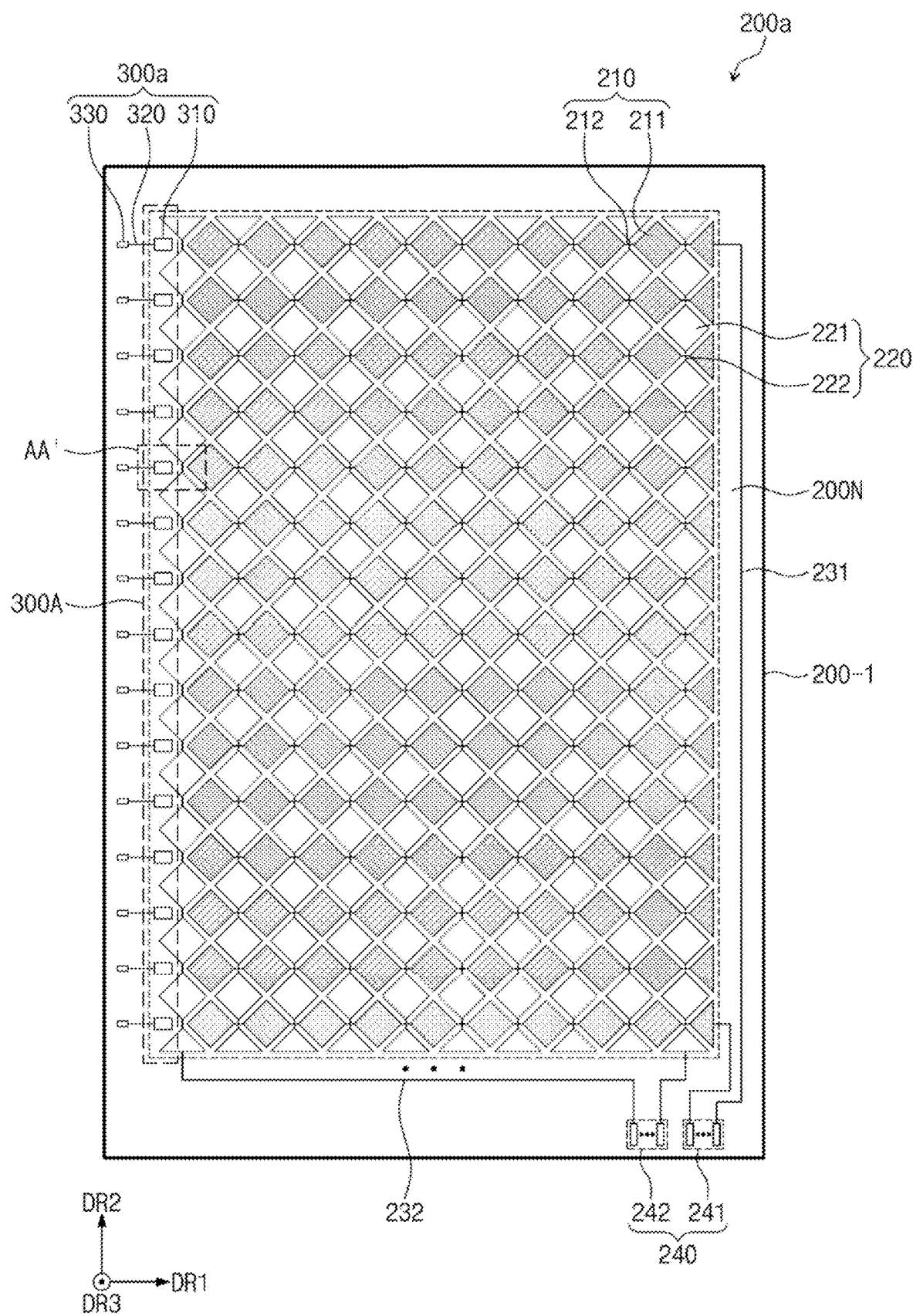
FIG. 7 is a plan view showing an input sensor according to an embodiment of the present disclosure.

FIG. 6 is a cross-sectional view showing an electronic apparatus 1000a according to an embodiment of the present disclosure. FIG. 7 is a plan view showing an input sensor 200a according to an embodiment of the present disclosure.

Referring to FIGS. 6 and 7, the electronic apparatus 1000a may include a display panel 100, the input sensor 200a, and a window 400.

The input sensor 200a may include a sensing area 200Aa and an antenna area 300A. The sensing area 200Aa may be an area in which the external input is sensed. First and second sensing electrodes 210 and 220 may be disposed in the sensing area 200Aa. The antenna area 300A may be an area in which a radio frequency signal is transmitted, received, or both transmitted and received.

The antenna 300a may include a radiation portion 310, a connection portion 320, and a pad portion 330. The radiation portion 310 may be disposed in the antenna area 300A, the connection portion 320 may extend from the radiation portion 310 to a peripheral area 200N, and the pad portion 330 may be disposed in the peripheral area 200N. For example, the antenna 300a may be installed in the input sensor 200a.

Some portions of the first and second sensing electrodes 210 and 220 may be omitted, and the radiation portion 310 may be disposed in areas from which some portions of the first and second sensing electrodes 210 and 220 are omitted. In FIG. 7, some portions of first sensing patterns 211 are removed, and the radiation portion 310 is disposed in the area from which the some portions of the first sensing patterns 211 are removed, however, the present embodiment is not limited thereto or thereby.

The radiation portion 310 may be disposed on the same layer as the sensing patterns 211 and 221. For example, the radiation portion 310 and the sensing patterns 211 and 221 may be disposed on the base insulating layer 200-1.

The radiation portion 310 may include the same material as the first and second sensing patterns 211 and 221 and may be formed through the same process as the first and second sensing patterns 211 and 221. For example, the first and second sensing patterns 211 and 221 and the radiation portion 310 may include a carbon nanotube, a metal material, a metal alloy, or composites thereof and may have a single-layer or multi-layer structure. For example, the first and second sensing patterns 211 and 221 and the radiation portion 310 may have the multi-layer structure in which titanium (Ti), aluminum (Al), and titanium (Ti) are sequentially stacked.

The radiation portion 310 may include different materials from the first and second sensing patterns 211 and 221 and may be formed through a separate process. For example, the first and second sensing patterns 211 and 221 may have the multi-layer structure in which titanium (Ti), aluminum (Al), and titanium (Ti) are sequentially stacked, and the radiation portion 310 may include a carbon nanotube, a metal material, a metal alloy, or composites thereof and may have a single-layer or multi-layer structure. For example, the metal material may be silver (Ag), copper (Cu), aluminum (Al), gold (Au), or platinum (Pt), however, the metal material is not limited thereto or thereby.

FIG. 7 shows a structure in which the antenna 300a is provided in a plural number and the antennas 300a are arranged in the second direction DR2 and spaced apart from each other. An antenna area 300A in which the antenna 300a is disposed may overlap the second display surface 1000BA (refer to FIG. 1) described with reference to FIG. 1.

Figure 8:
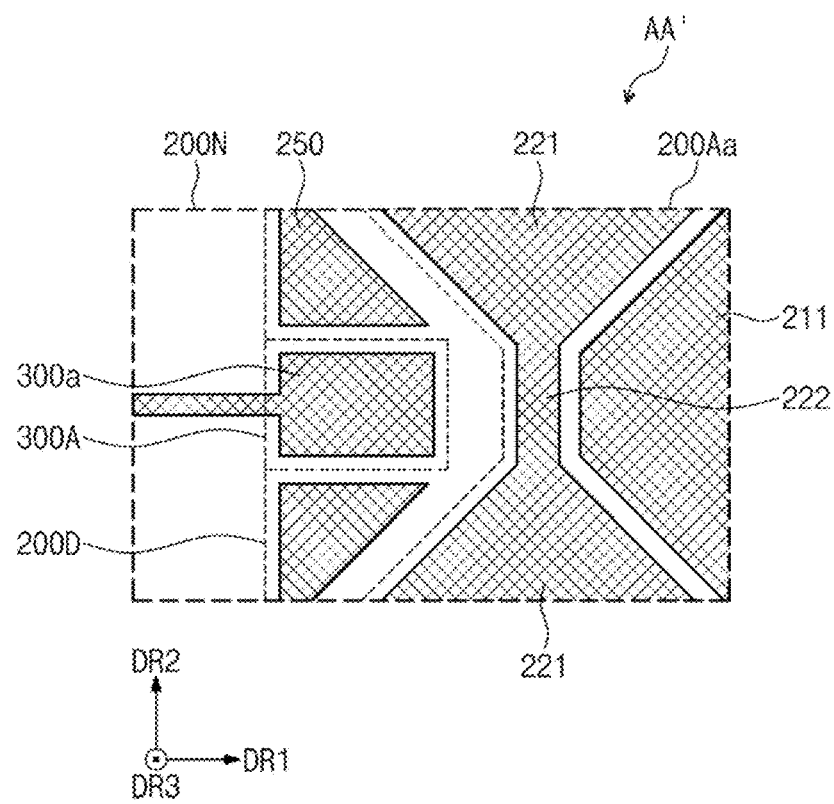
FIG. 8 is an enlarged plan view showing a portion AA' shown in FIG. 7.

FIG. 8 is an enlarged plan view showing a portion AA' shown in FIG. 7.

Referring to FIGS. 7 and 8, the input sensor 200a may further include a dummy electrode 250.

The sensing area 200Aa, the antenna area 300A, a dummy area 200D, and the peripheral area 200N may be defined in the input sensor 200a. The first and second sensing electrodes 210 and 220 are disposed in the sensing area 200Aa. The antenna 300a is disposed in the antenna area 300A. The dummy electrode 250 is disposed in a dummy area 200D. The sensing area 200Aa, the antenna area 300A, and the dummy area 200D is surrounded by the peripheral area 200N.

The dummy electrode 250 may be disposed in the dummy area 200D defined between the sensing area 200Aa and the antenna area 300A. When the dummy electrode 250 is not disposed, a reflectance and a transmittance of the dummy area 200D may be different from the reflectance and the transmittance of the sensing area 200Aa and the antenna area 300A. However, since the dummy electrode 250 is disposed, the reflectance difference and the transmittance difference may be reduced. As a result, a specific boundary, e.g., a boundary between the antenna 300a and the second sensing pattern 221 or a boundary between the antenna 300a and a second connection pattern 222 may be prevented from being viewed.

The sensing area 200Aa, the antenna area 300A, and the dummy area 200D may overlap the active area 100A (refer to FIG. 3) of the display panel 100 (refer to FIG. 3). Therefore, the size of the sensing area 200Aa may be smaller than the size of the active area 100A (refer to FIG. 3).

Figure 9:
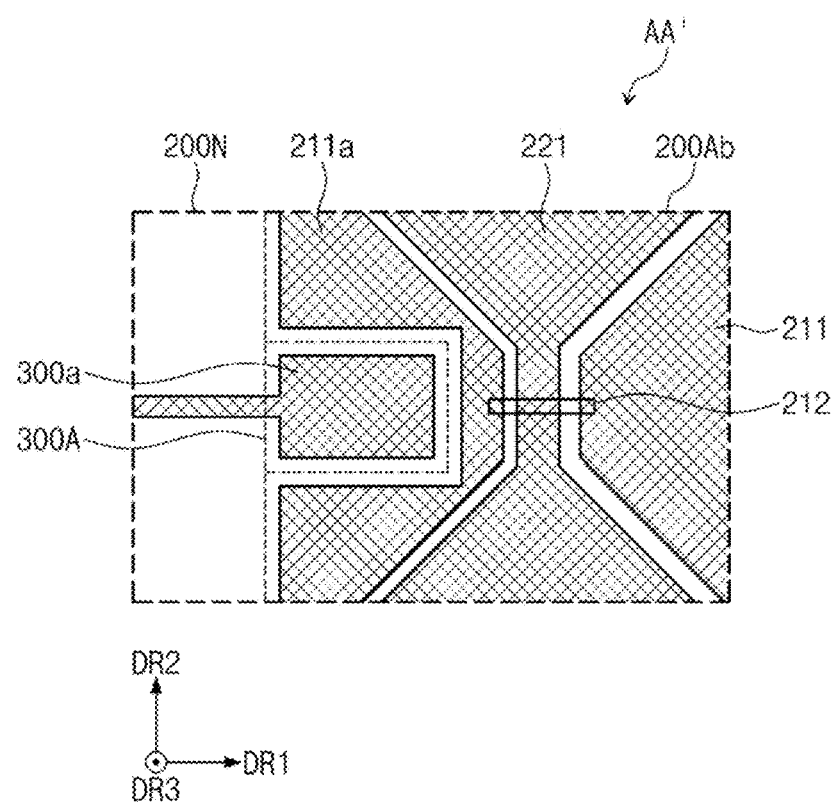
FIG. 9 is an enlarged plan view showing a portion AA' shown in FIG. 7.

FIG. 9 is an enlarged plan view showing a portion AA' shown in FIG. 7.

Referring to FIGS. 7 and 9, a sensing area 200Ab, an antenna area 300A, and a peripheral area 200N may be defined in an input sensor 200a. First and second sensing electrodes 210 and 220 are disposed in the sensing area 200Ab. Antenna 300a is disposed in an antenna area 300A. Sensing area 200Ab and the antenna area 300A are surrounded by a peripheral area 200N.

A sensing pattern 211a of first and second sensing patterns 211 and 221 may be patterned to correspond to a shape of the antenna 300a. For example, the sensing pattern 211a may be patterned to be spaced apart from the antenna 300a by a predetermined distance. In this case, a size of the sensing area 200Ab in which the external input is sensed may be greater than the size of the sensing area 200Aa of the embodiment described with reference to FIG. 8. In addition, since the sensing pattern 211a is disposed around the antenna area 300A, a phenomenon in which the antenna 300a is viewed due to the reflectance difference and the transmittance difference may be prevented.

The sensing area 200Ab and the antenna area 300A may overlap the active area 100A (refer to FIG. 3) of the display panel 100 (refer to FIG. 3). Therefore, the size of the sensing area 200Ab may be smaller than the size of the active area 100A (refer to FIG. 3).

Figure 10A:
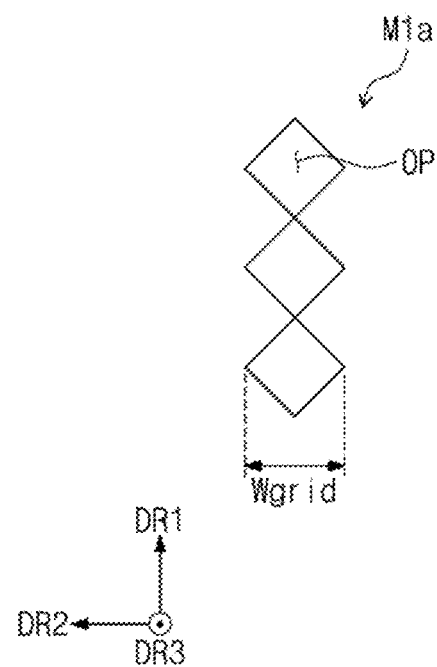
FIGS. 10A, 10B, and 10C are views showing mesh structures.
Figure 10B:
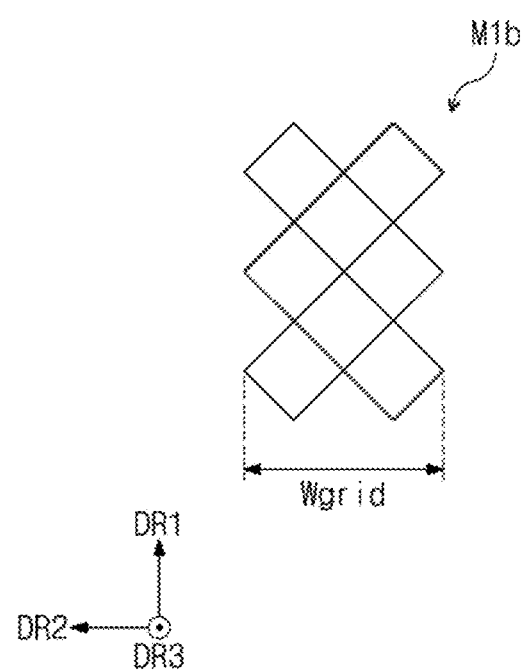
Figure 10C:
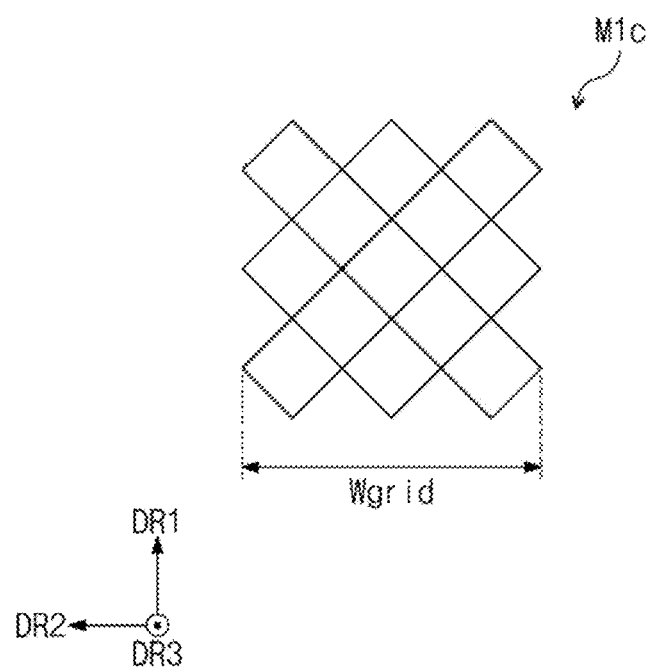
Figure 11:
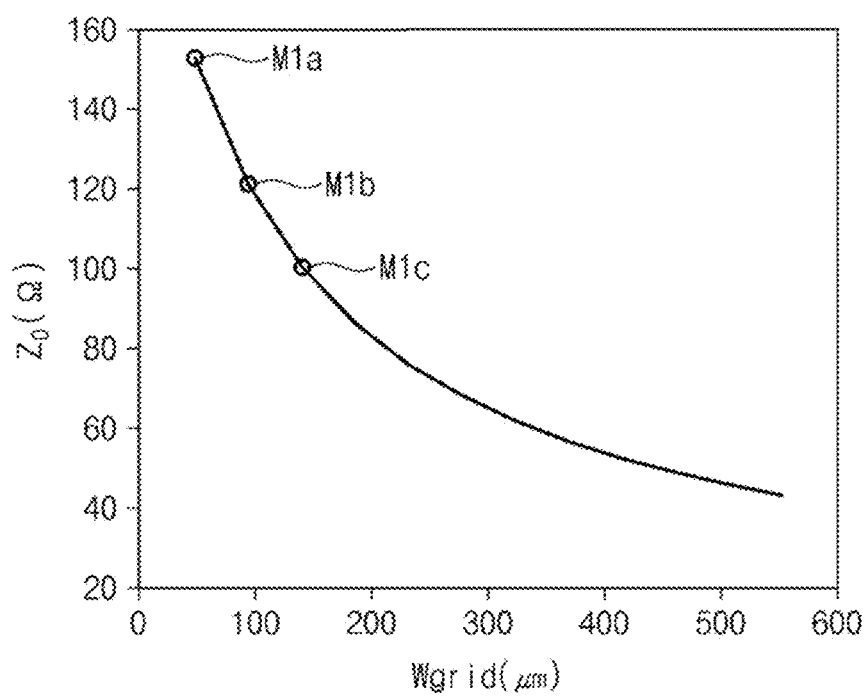
FIG. 11 is a graph showing a characteristic impedance according to a width of the mesh structure.

FIGS. 10A, 10B, and 10C are views showing mesh structures. FIG. 11 is a graph showing a characteristic impedance according to a width of the mesh structure.

Referring to FIGS. 10A, 10B, and 10C, first, second, and third mesh structures M1a, M1b, and M1c are shown. The first, second, and third mesh structures M1a, M1b, and M1c may have the same structure. The expression "the same structure" may mean that openings OP defined in each of the first, second, and third mesh structures M1a, M1b, and M1c have the same shape and size.

Each opening OP may have a rhombus or a lozenge shape. In FIGS. 10A, 10B, and 10C, diagonal lines of each opening OP have the same length as each other, however, the present disclosure is not limited thereto or thereby. For example, the diagonal lines of each opening OP may have different lengths from each other. In addition, the shape of each opening OP may be changed by taking into account the pixel area of the display panel 100 (refer to FIG. 3). For example, each opening OP may have a rectangular shape, a circular shape, or a polygonal shape.

The first, second, and third mesh structures M1a, M1b, and M1c may have different widths Wgrid from each other. For example, when the first mesh structure M1a has a width Wgrid of about 50 micrometers, the second mesh structure M1b may have a width Wgrid of about 100 micrometers, and the third mesh structure M1c may have a width Wgrid of about 150 micrometers.

Referring to FIG. 11, it is observed that the characteristic impedance of the mesh structure gradually decreases as the width Wgrid increases under the same length condition. The increasing of the width Wgrid may mean that the opening OP is added in a direction substantially parallel to the width Wgrid.

Impedance refers to the opposition that a circuit element presents to a current when a voltage is applied. In some cases, impedance may depend on the frequency of a sinusoidal voltage. In some cases, an impedance possess both magnitude and phase. The characteristic impedance or surge impedance ($Z_0$) refers to the ratio of the voltage and current of a single wave propagating along a line (i.e., in the absence of reflections in the other direction).

The width Wgrid may be substantially parallel to the second direction DR2, and a length of the mesh structure may mean a length in a direction crossing the width Wgrid at an angle of about 90 degrees, i.e., a length in the first direction DR1. The first direction DR1 may be referred to as a "propagation direction", and the second direction DR2 may be referred to as a "transverse direction".

Figure 12:
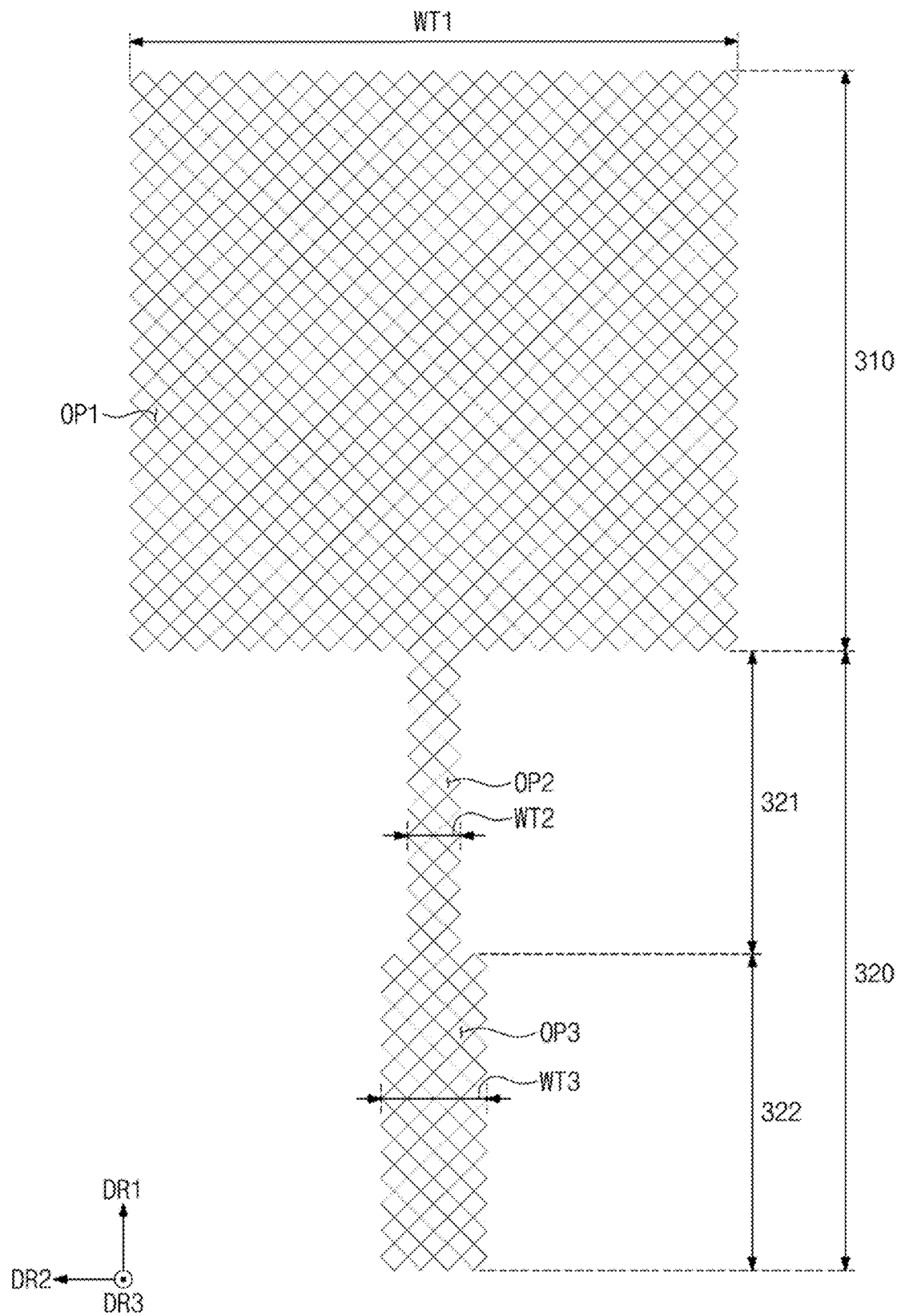
FIG. 12 is an enlarged plan view showing an antenna according to an embodiment of the present disclosure.
Figure 13A:
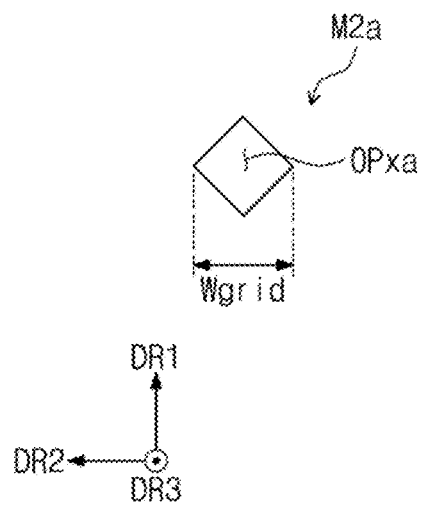
FIGS. 13A, 13B, 13C, and 13D are views showing mesh structures.
Figure 13B:
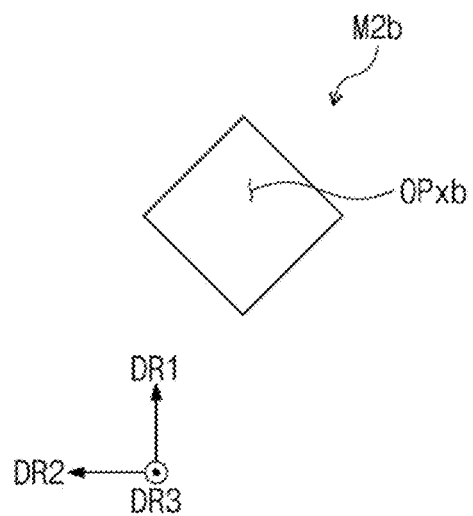
Figure 13C:
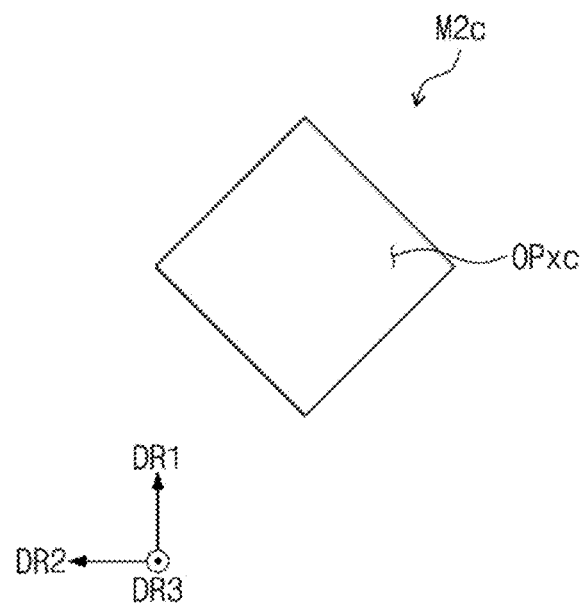
Figure 13D:
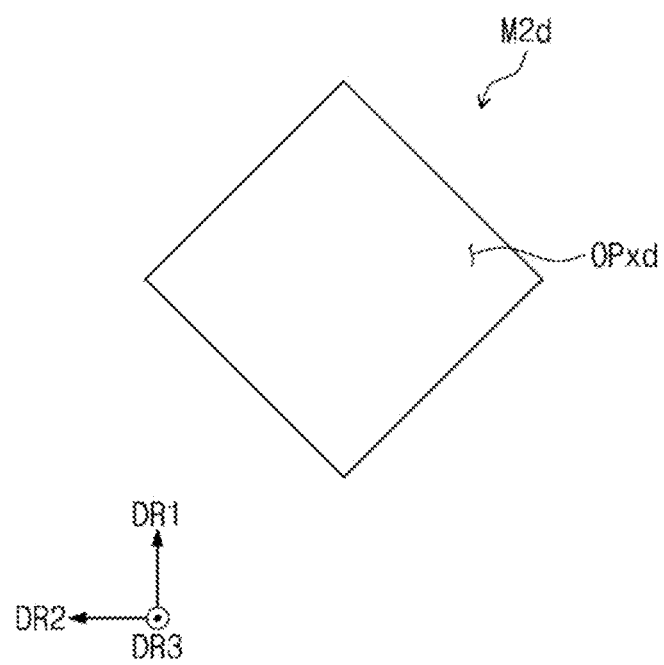

FIG. 12 is an enlarged plan view showing an antenna according to an embodiment of the present disclosure.

In FIG. 12, the radiation portion 310 and the connection portion 320 are enlarged and shown. The radiation portion 310 may be referred to as a "first pattern portion" 310. The connection portion 320 may include a second pattern portion 321 and a third pattern portion 322.

The first pattern portion 310, the second pattern portion 321, and the third pattern portion 322 may be sequentially arranged in the first direction DR1. The second pattern portion 321 may be disposed adjacent to the first pattern portion 310. The third pattern portion 322 may be disposed adjacent to the second pattern portion 321. The first pattern portion 310, the second pattern portion 321, and the third pattern portion 322 may include the same material and may be formed through the same process. The first pattern portion 310, the second pattern portion 321, and the third pattern portion 322 may be connected to each other to have an integral shape.

The second pattern portion 321 may be electrically connected to or electrically contacted to the first pattern portion 310. The second pattern portion 321 may extend from the first pattern portion 310. The third pattern portion 322 may be electrically connected to or electrically contacted to the second pattern portion 321. The third pattern portion 322 may extend from the second pattern portion 321. The second pattern portion 321 may be disposed between the first pattern portion 310 and the third pattern portion 322.

The first pattern portion 310 may have a first characteristic impedance and a first mesh structure, the second pattern portion 321 may have a second characteristic impedance and a second mesh structure, and the third pattern portion 322 may have a third characteristic impedance and a third mesh structure.

A first opening OP1 with a first size may be defined in the first mesh structure, a second opening OP2 with a second size may be defined in the second mesh structure, and a third opening OP3 with a third size may be defined in the third mesh structure. In one embodiment, the first size, the second size, and the third size may be substantially the same as each other. For example, the first mesh structure, the second mesh structure, and the third mesh structure may have substantially the same mesh pattern.

The first characteristic impedance of the first pattern portion 310, the second characteristic impedance of the second pattern portion 321, and the third characteristic impedance of the third pattern portion 322 may be different from each other. For example, the second characteristic impedance may have a value between the first characteristic impedance and the third characteristic impedance. For example, the first characteristic impedance may be greater than the second characteristic impedance, and the second characteristic impedance may be greater than the third characteristic impedance. For example, as the characteristic impedance may be gradually changed by the second and third pattern portions 321 and 322, a reflective loss due to the change of the characteristic impedance may be reduced. When the reflective loss is reduced, the antenna efficiency may be increased. The antenna efficiency may be referred to as an "antenna gain".

For example, the first characteristic impedance may be within a range from about 100 ohms to about 200 ohms, and the third characteristic impedance may be about 50 ohms. The second characteristic impedance may have a value greater than about 50 ohms and smaller than the first characteristic impedance. For example, when the first characteristic impedance is about 100 ohms, the second characteristic impedance may be about 75 ohms.

The first pattern portion 310 may have a first width WT1, the second pattern portion 321 may have a second width WT2, and the third pattern portion 322 may have a third width WT3. The first width WT1, the second width WT2, and the third width WT3 may be widths in the second direction DR2 crossing the first direction DR1.

According to the embodiment of the present disclosure, the characteristic impedances may be controlled by adjusting the first, second, and third widths WT1, WT2, and WT3 of the first, second, and third pattern portions 310, 321, and 322. For example, the first pattern portion 310 may correspond to the radiation portion that transmits, receives, or both transmits and receives the radio frequency signal and may have the first width WT1 that may be the largest among the first, second, and third widths WT1, WT2, and WT3. For example, the second width WT2 and the third width WT3 may be smaller than the first width WT1. The second pattern portion 321 may be a quarter-wave transformer, and the third pattern portion 322 may be a transmission line.

The number of the first openings OP1 (hereinafter, referred to as a "first number") arranged in the second direction DR2 in the first pattern portion 310 may be greater than the number of the second openings OP2 (hereinafter, referred to as a "second number") arranged in the second direction DR2 in the second pattern portion 321. The number of the third openings OP3 arranged in the second direction DR2 in the third pattern portion 322 may be greater than the second number and smaller than the first number.

In FIG. 12, widths of line patterns of the first pattern portion 310, the second pattern portion 321, and the third pattern portion 322 may be the same as each other. For example, the line patterns may define the first opening OP1, the second opening OP2, and the third opening OP3 and are indicated by a solid line in FIG. 12. Each width of the line patterns may be about 1 micrometer. However, the width of the line patterns is not limited thereto or thereby. In addition, the widths of the line patterns may be different from each other according to an embodiment of the present disclosure.

According to FIGS. 10A, 10B, and 10C and 11, it is observed that the characteristic impedance decreases as the width Wgrid of the mesh structure increases under the same length condition. Accordingly, as the second width WT2 of the second pattern portion 321 is designed to be smaller than the third width WT3 of the third pattern portion 322, the characteristic impedance of the second pattern portion 321 may be designed to be greater than the characteristic impedance of the third pattern portion 322. As the characteristic impedance may be gradually changed, the reflective loss may be reduced. Therefore, the antenna efficiency may be increased.

Thus, according to some embodiments an antenna may include a first pattern portion having a first characteristic impedance; a second pattern portion adjacent to the first pattern portion and having a second characteristic impedance; and a third pattern portion disposed adjacent to the second pattern portion and having a third characteristic impedance, wherein the second characteristic impedance is between the first characteristic impedance and the third characteristic impedance. In some cases, the first pattern portion comprises a first mesh structure, the second pattern portion comprises a second mesh structure, and the third pattern portion comprises a third mesh structure.

Figure 14:
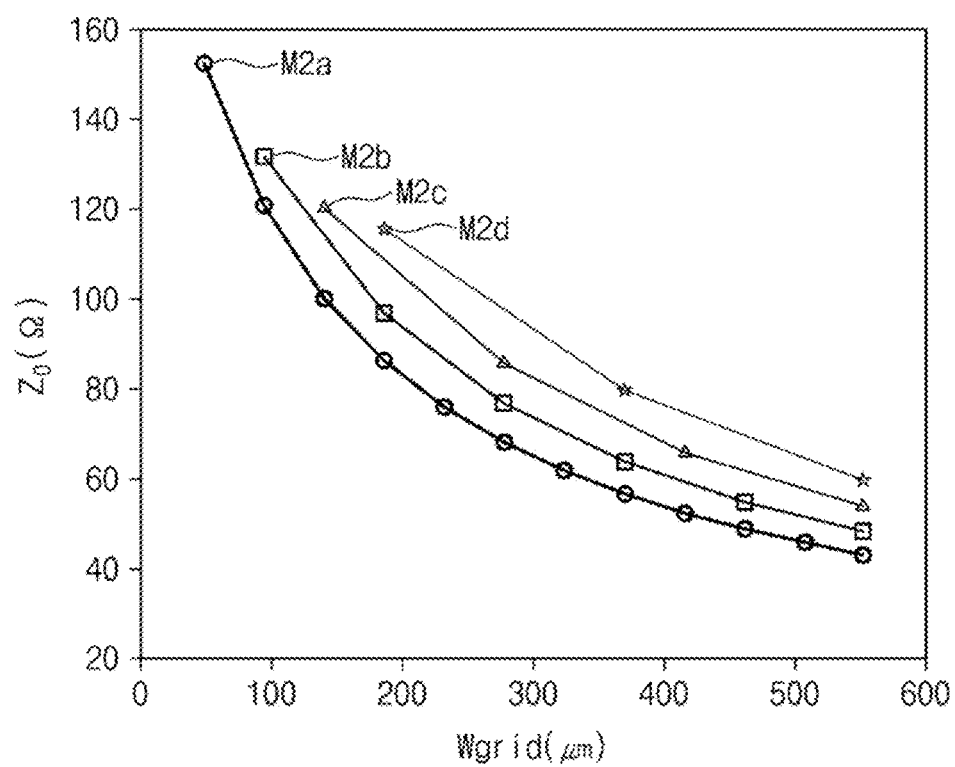
FIG. 14 is a graph showing a characteristic impedance according to a width of the mesh structure.

FIGS. 13A, 13B, 13C, and 13D are views showing mesh structures. FIG. 14 is a graph showing a characteristic impedance according to a width of the mesh structure.

Referring to FIGS. 13A, 13B, 13C, and 13D, first, second, third, and fourth mesh structures M2a, M2b, M2c, and M2d are shown. The first, second, third, and fourth mesh structures M2a, M2b, M2c, and M2d may have different structures from each other. The difference in structures may mean that at least one of a shape and a size of first, second, third, and fourth openings OPxa, OPxb, OPxc, and OPxd respectively defined in the first, second, third, and fourth mesh structures M2a, M2b, M2c, and M2d is different from others.

Each of the first, second, third, and fourth openings OPxa, OPxb, OPxc, and OPxd may have a diamond, a rhombus or a lozenge shape. Lengths of diagonal lines of the first, second, third, and fourth openings OPxa, OPxb, OPxc, and OPxd may be different from each other. For example, when the length of the diagonal line of the first opening OPxa of the first mesh structure M2a is about 50 micrometers, the length of the diagonal line of the second opening OPxb of the second mesh structure M2b is about 100 micrometers, the length of the diagonal line of the third opening OPxc of the third mesh structure M2c is about 150 micrometers, and the length of the diagonal line of the fourth opening OPxd of the fourth mesh structure M2d is about 200 micrometers.

Referring to FIG. 14, the characteristic impedance may decrease as the lengths of the diagonal lines of the first, second, third, and fourth openings OPxa, OPxb, OPxc, and OPxd increase. In addition, in FIG. 11, it is observed that the characteristic impedance decreases as the width Wgrid increases. The increasing of the width Wgrid may mean that the opening is added in a direction substantially parallel to the width Wgrid (refer to FIGS. 10A to 10C). For example, the width Wgrid of a mesh structure obtained when one first opening OPxa is added to the first mesh structure M2a may be the same as the width Wgrid of the second mesh structure M2b.

Figure 15:
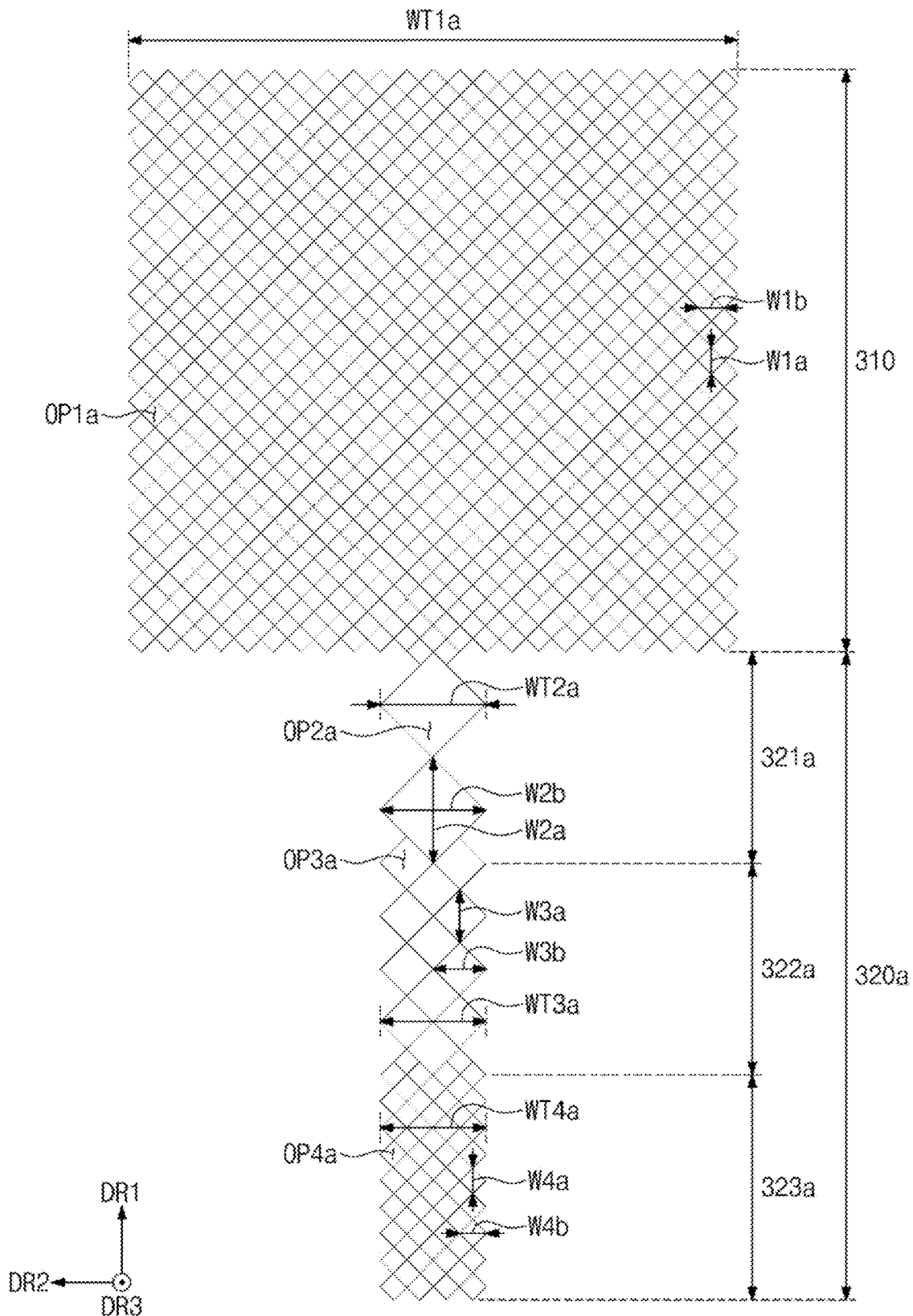
FIG. 15 is an enlarged plan view showing an antenna according to an embodiment of the present disclosure.

FIG. 15 is an enlarged plan view showing an antenna according to an embodiment of the present disclosure.

In FIG. 15, a radiation portion 310 and a connection portion 320a are enlarged and shown. The radiation portion 310 may be referred to as a "first pattern portion" 310. The connection portion 320a may include a second pattern portion 321a, a third pattern portion 322a, and a fourth pattern portion 323a. FIG. 15 shows a structure in which the connection portion 320a is divided into three pattern portions, but is not limited thereto. The connection portion 320a may be divided into two pattern portions or may be divided into four or more pattern portions.

The first pattern portion 310, the second pattern portion 321a, the third pattern portion 322a, and the fourth pattern portion 323a may be sequentially arranged in the first direction DR1. The first pattern portion 310, the second pattern portion 321a, the third pattern portion 322a, and the fourth pattern portion 323a may be connected to each other to have an integral shape.

The first pattern portion 310 may have a first width WT1a. The second pattern portion 321a may have a second width WT2a. The third pattern portion 322a may have a third width WT3a. The fourth pattern portion 323a may have a fourth width WT4a. The first width WT1a, the second width WT2a, the third width WT3a, and the fourth width WT4a may be widths in the second direction DR2 crossing the first direction DR1.

The first pattern portion 310 may correspond to the radiation portion that transmits, receives, or both transmits and receives the radio frequency signal and may have the first width WT1a that may be the largest width. The second, third, and fourth widths WT2a, WT3a, and WT4a may be smaller than the first width WT1a. In addition, the second, third, and fourth widths WT2a, WT3a, and WT4a may be the same as each other.

The first pattern portion 310 may have a first characteristic impedance and a first mesh structure. The second pattern portion 321a may have a second characteristic impedance different from the first characteristic impedance and a second mesh structure different from the first mesh structure. The third pattern portion 322a may have a third characteristic impedance different from the second characteristic impedance and a third mesh structure different from the second mesh structure. The fourth pattern portion 323a may have a fourth characteristic impedance different from the third characteristic impedance and a fourth mesh structure different from the third mesh structure.

For example, a relationship between the first, second, third, and fourth characteristic impedances may satisfy the relation: first characteristic impedance>second characteristic impedance>third characteristic impedance>fourth characteristic impedance.

The reflective loss due to the change of the characteristic impedance may be reduced as the characteristic impedance is gradually changed by the second, third, and fourth pattern portions 321a, 322a, and 323a.

A first opening OP1a with a first size may be defined in the first pattern portion 310, a second opening OP2a with a second size may be defined in the second pattern portion 321a, a third opening OP3a with a third size may be defined in the third pattern portion 322a, and a fourth opening OP4a with a fourth size may be defined in the fourth pattern portion 323a. The second, third, and fourth sizes of the second, third, and fourth openings OP2a, OP3a, and OP4a may be different from each other. For example, according to the embodiment of the present disclosure, the characteristic impedances may be controlled by adjusting the size of the first, second, third, and fourth openings OP1a, OP2a, OP3a, and OP4a of the first, second, third, and fourth pattern portions 310, 321a, 322a, and 323a.

A length of a first diagonal line W1a and a length of a second diagonal line W1b of the first opening OP1a may be the same as each other or may be different from each other. A length of a first diagonal line W2a and a length of a second diagonal line W2b of the second opening OP2a may be the same as each other or may be different from each other. A length of a first diagonal line W3a and a length of a second diagonal line W3b of the third opening OP3a may be the same as each other or may be different from each other. A length of a first diagonal line W4a and a length of a second diagonal line W4b of the fourth opening OP4a may be the same as each other or may be different from each other.

The first diagonal lines W1a, W2a, W3a, and W4a are respectively diagonal lines of the first, second, third, and fourth openings OP1a, OP2a, OP3a, and OP4a substantially parallel to the first direction DR1. The second diagonal lines W1b, W2b, W3b, and W4b are respectively diagonal lines of the first, second, third, and fourth openings OP1a, OP2a, OP3a, and OP4a substantially parallel to the second direction DR2.

In the present disclosure, the diagonal lines of the opening may be referred to as widths of the opening. For example, the first diagonal lines W1a, W2a, W3a, and W4a may be respectively referred to as widths of the first, second, third, and fourth openings OP1a, OP2a, OP3a, and OP4a substantially parallel to the first direction DR1. The second diagonal lines W1b, W2b, W3b, and W4b may be respectively referred to as widths of the first, second, third, and fourth openings OP1a, OP2a, OP3a, and OP4a substantially parallel to the second direction DR2.

A first ratio of the first diagonal line W1a to the second diagonal line W1b of the first opening OP1a may be substantially the same as a second ratio of the first diagonal line W2a to the second diagonal line W2b of the second opening OP2a, a third ratio of the first diagonal line W3a to the second diagonal line W3b of the third opening OP3a, and a fourth ratio of the first diagonal line W4a to the second diagonal line W4b of the fourth opening OP4a. Additionally or alternatively, the second ratio, the third ratio, and the fourth ratio may be the same as each other, and the first ratio may be different from the second ratio. The first diagonal lines W2a, W3a, and W4a may satisfy the relation: first diagonal line W2a>First diagonal line W3a>First diagonal line W4a.

The second diagonal lines W2b, W3b, and W4b may satisfy the relation: second diagonal line W2b>second diagonal line W3b>second diagonal line W4b.

The number of the first openings OP1a (hereinafter, referred to as a first number) arranged in the second direction DR2 in the first pattern portion 310 may be greater than each of the number of the second openings OP2a, the number of the third openings OP3a, and the number of the fourth openings OP4a. The number of the second openings OP2a (hereinafter, referred to as a second number) may be arranged in the second direction DR2 in the second pattern portion 321a. The number of the third openings OP3a (hereinafter, referred to as a third number) may be arranged in the second direction DR2 in the third pattern portion 322a. The number of the fourth openings OP4a (hereinafter, referred to as a fourth number) may be arranged in the second direction DR2 in the fourth pattern portion 323a. The fourth number may be greater than the second number and the third number, and the third number may be greater than the second number.

Figure 16:
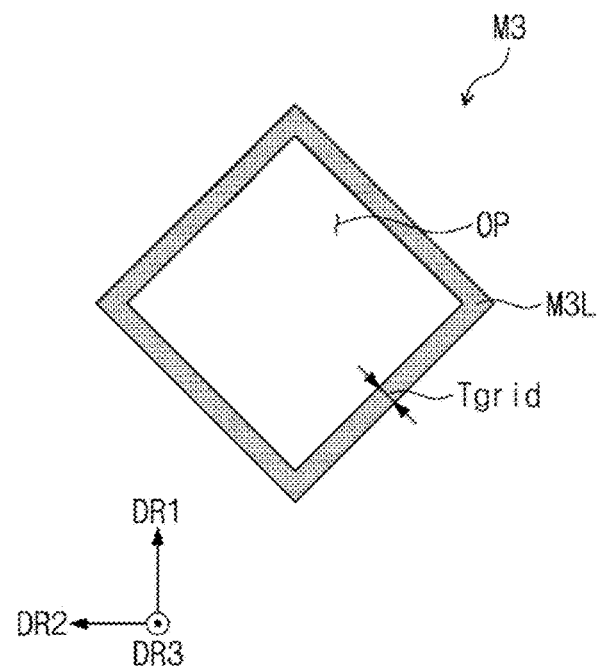
FIG. 16 is a view showing a mesh structure.
Figure 17:
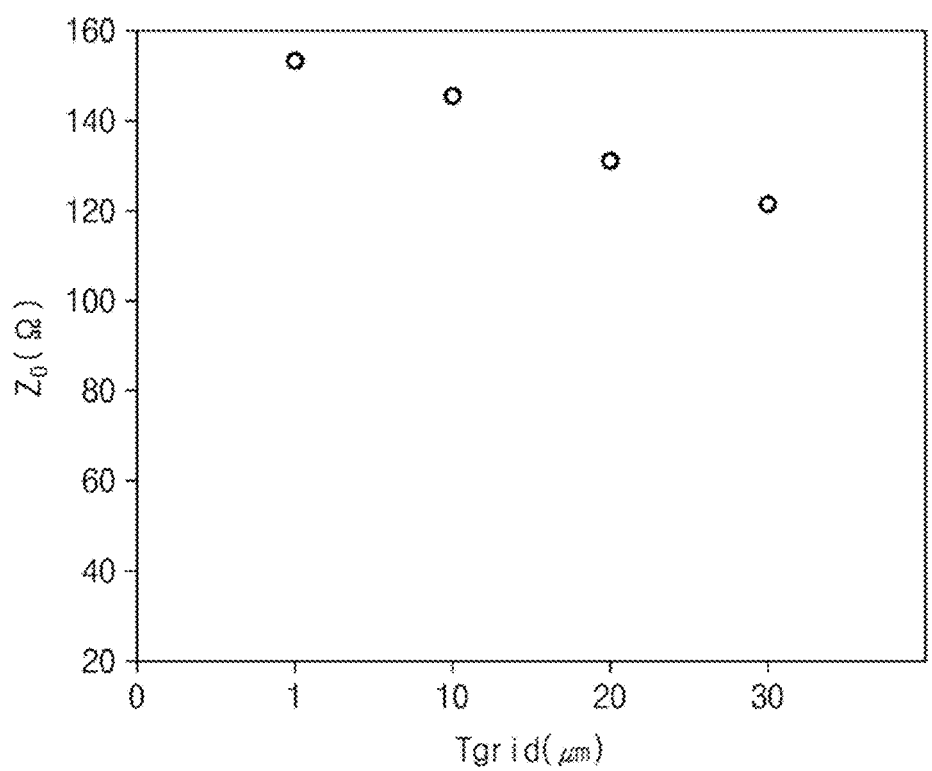
FIG. 17 is a graph showing a characteristic impedance according to a width of a line pattern of the mesh structure.

FIG. 16 is a view showing a mesh structure. FIG. 17 is a graph showing a characteristic impedance according to a width of a line pattern of the mesh structure.

Referring to FIG. 16, one mesh structure M3 is shown. The mesh structure M3 may include a line pattern M3L, and the line pattern M3L may have a predetermined width Tgrid. The line pattern M3L may surround an opening OP and may define the opening OP.

FIG. 17 shows a change in the characteristic impedance according to the width Tgrid of the line pattern M3L of the mesh structure M3. As the width Tgrid increases, the characteristic impedance may decrease.

Figure 18:
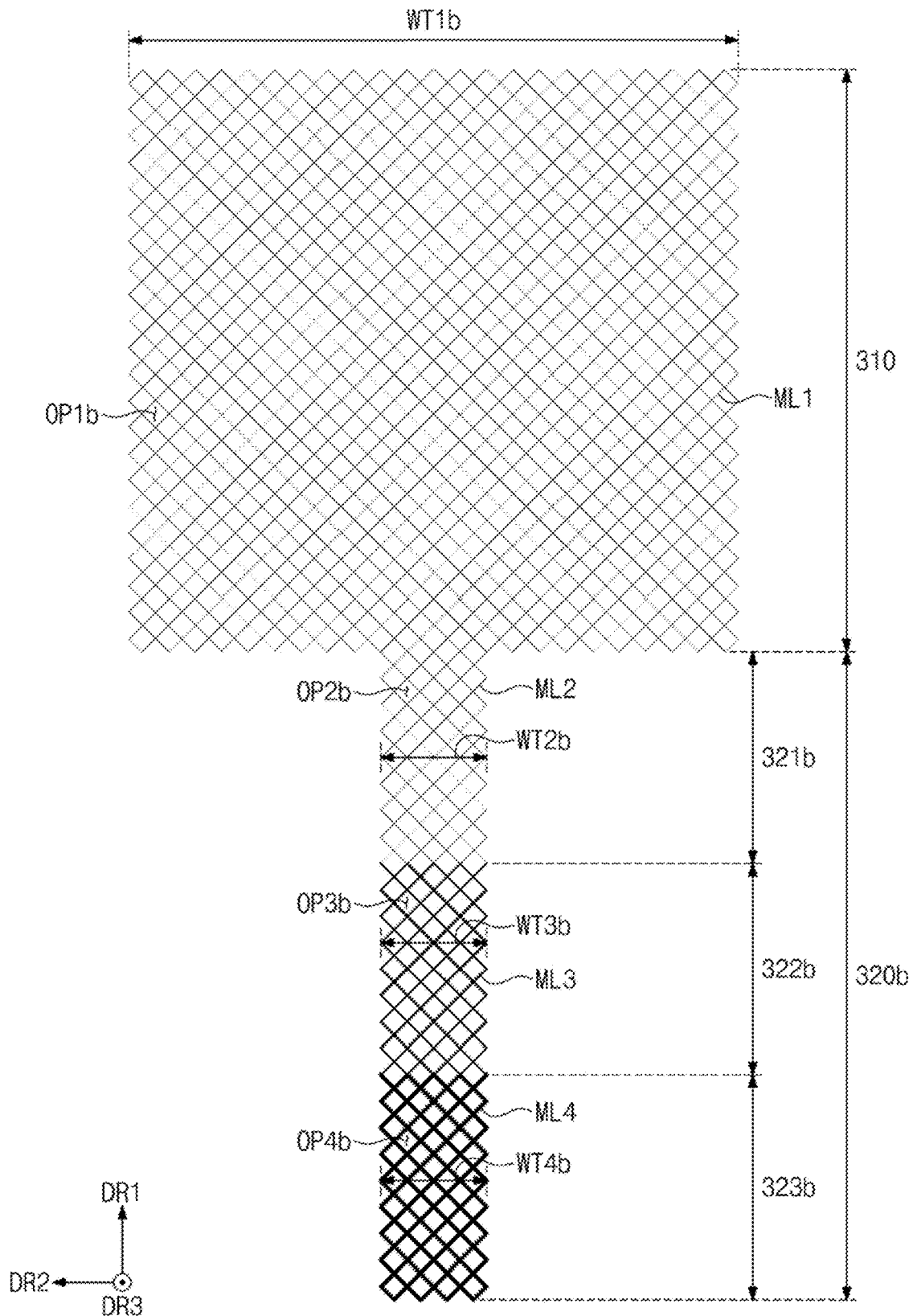
FIG. 18 is an enlarged plan view showing an antenna according to an embodiment of the present disclosure.

FIG. 18 is an enlarged plan view showing an antenna according to an embodiment of the present disclosure.

In FIG. 18, a radiation portion 310 and a connection portion 320b are enlarged and shown. The radiation portion 310 may be referred to as a "first pattern portion" 310. The connection portion 320b may include a second pattern portion 321b, a third pattern portion 322b, and a fourth pattern portion 323b. FIG. 18 shows a structure in which the connection portion 320b is divided into three pattern portions, however, the connection portion 320b may be divided into two pattern portions or may be divided into four or more pattern portions.

The first pattern portion 310, the second pattern portion 321b, the third pattern portion 322b, and the fourth pattern portion 323b may be sequentially arranged in the first direction DR1. The first pattern portion 310, the second pattern portion 321b, the third pattern portion 322b, and the fourth pattern portion 323b may be connected to each other to have an integral shape.

The first pattern portion 310 may have a first width WT1b, the second pattern portion 321b may have a second width WT2b, the third pattern portion 322b may have a third width WT3b, and the fourth pattern portion 323b may have a fourth width WT4b. The first width WT1b, the second width WT2b, the third width WT3b, and the fourth width WT4b may be widths in the second direction DR2 crossing the first direction DR1.

The first pattern portion 310 may correspond to the radiation portion that transmits, receives, or both transmits and receives the radio frequency signal and may have the first width WT1b that may be the largest width. Each of the second, third, and fourth widths WT2b, WT3b, and WT4b may be smaller than the first width WT1b. In addition, the second, third, and fourth widths WT2b, WT3b, and WT4b may be the same as each other.

A first opening OP1b with a first size may be defined in the first pattern portion 310, a second opening OP2b with a second size may be defined in the second pattern portion 321b, a third opening OP3b with a third size may be defined in the third pattern portion 322b, and a fourth opening OP4b with a fourth size may be defined in the fourth pattern portion 323b.

The first pattern portion 310 may include a first line pattern ML1, the second pattern portion 321b may include a second line pattern ML2, the third pattern portion 322b may include a third line pattern ML3, and the fourth pattern portion 323b may include a fourth line pattern ML4.

The fourth line pattern ML4 has a width greater than a width of the third line pattern ML3, and the width of the third line pattern ML3 may be greater than a width of the second line pattern ML2. Accordingly, the characteristic impedance of the fourth pattern portion 323b may be smaller than the characteristic impedance of the third pattern portion 322b. The characteristic impedance of the third pattern portion 322b may be smaller than the characteristic impedance of the second pattern portion 321b. Additionally or alternatively, the first pattern portion 310 may correspond to the radiation portion and may have the characteristic impedance greater than the characteristic impedance of the second pattern portion 321b.

According to the embodiment, the connection portion 320b may be divided into predetermined areas, and thicknesses of line patterns in the areas may be differently designed. For example, the characteristic impedance may be controlled by adjusting the thickness of the line pattern. In other words, the connection portion 320b may be designed to allow the characteristic impedance to be gradually changed. Therefore, the reflective loss may be reduced. As a result, the antenna efficiency may be increased.

Figure 19:
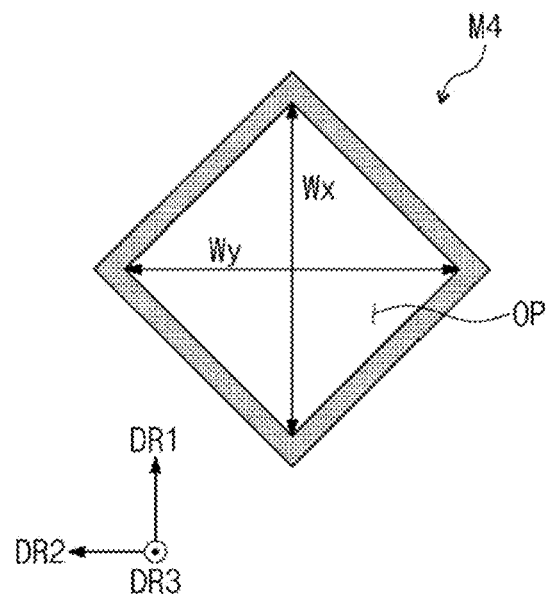
FIG. 19 is a view showing a mesh structure.
Figure 20:
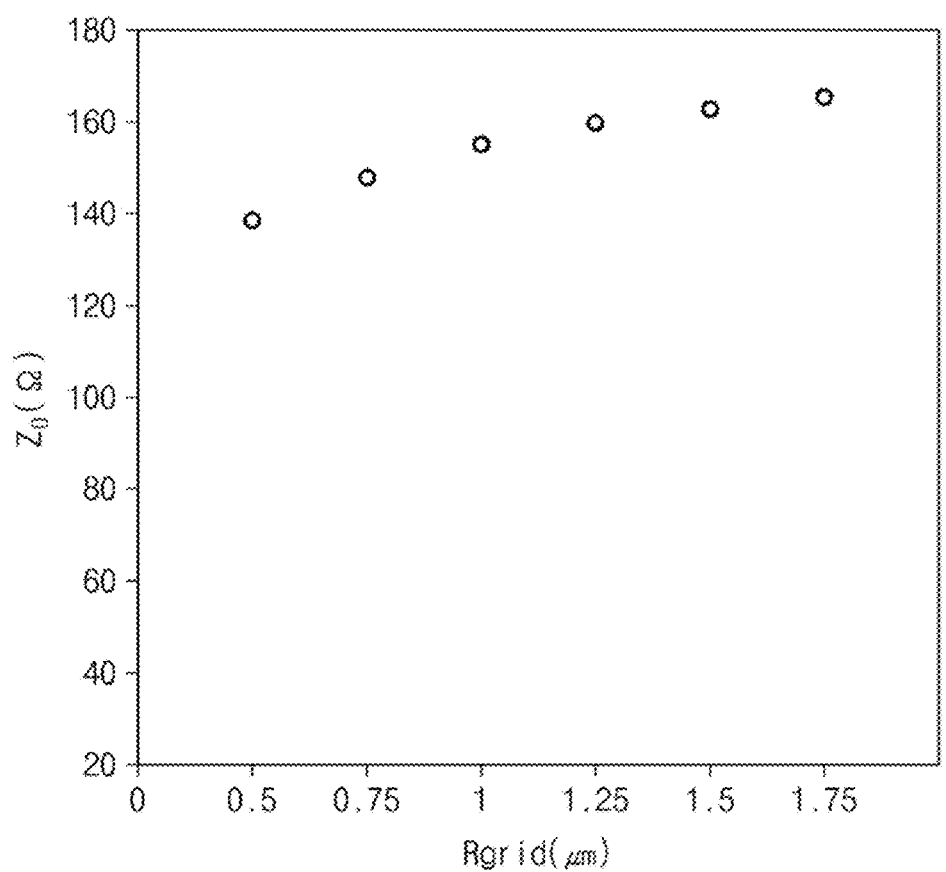
FIG. 20 is a graph showing a characteristic impedance according to a ratio of the mesh structure.

FIG. 19 is a view showing a mesh structure. FIG. 20 is a graph showing a characteristic impedance according to a ratio of the mesh structure.

Referring to FIG. 19, one mesh structure M4 is shown. An opening OP may be defined in the mesh structure M4. The opening OP may have a rhombus or a lozenge shape. A characteristic impedance of the mesh structure M4 may be changed depending on a ratio Rgrid of a first diagonal line Wx to a second diagonal line Wy of the opening OP.

The first diagonal line Wx may be substantially parallel to the first direction DR1, and the second diagonal line Wy may be substantially parallel to the second direction DR2. The ratio Rgrid may correspond to a value obtained by dividing the first diagonal line Wx by the second diagonal line Wy. The ratio Rgrid may be changed by adjusting a length of the first diagonal line Wx in a condition where a length of the second diagonal line Wy is fixed.

Referring to FIG. 20, the characteristic impedance of the mesh structure M4 may increase as the length of the first diagonal line Wx increases.

Figure 21:
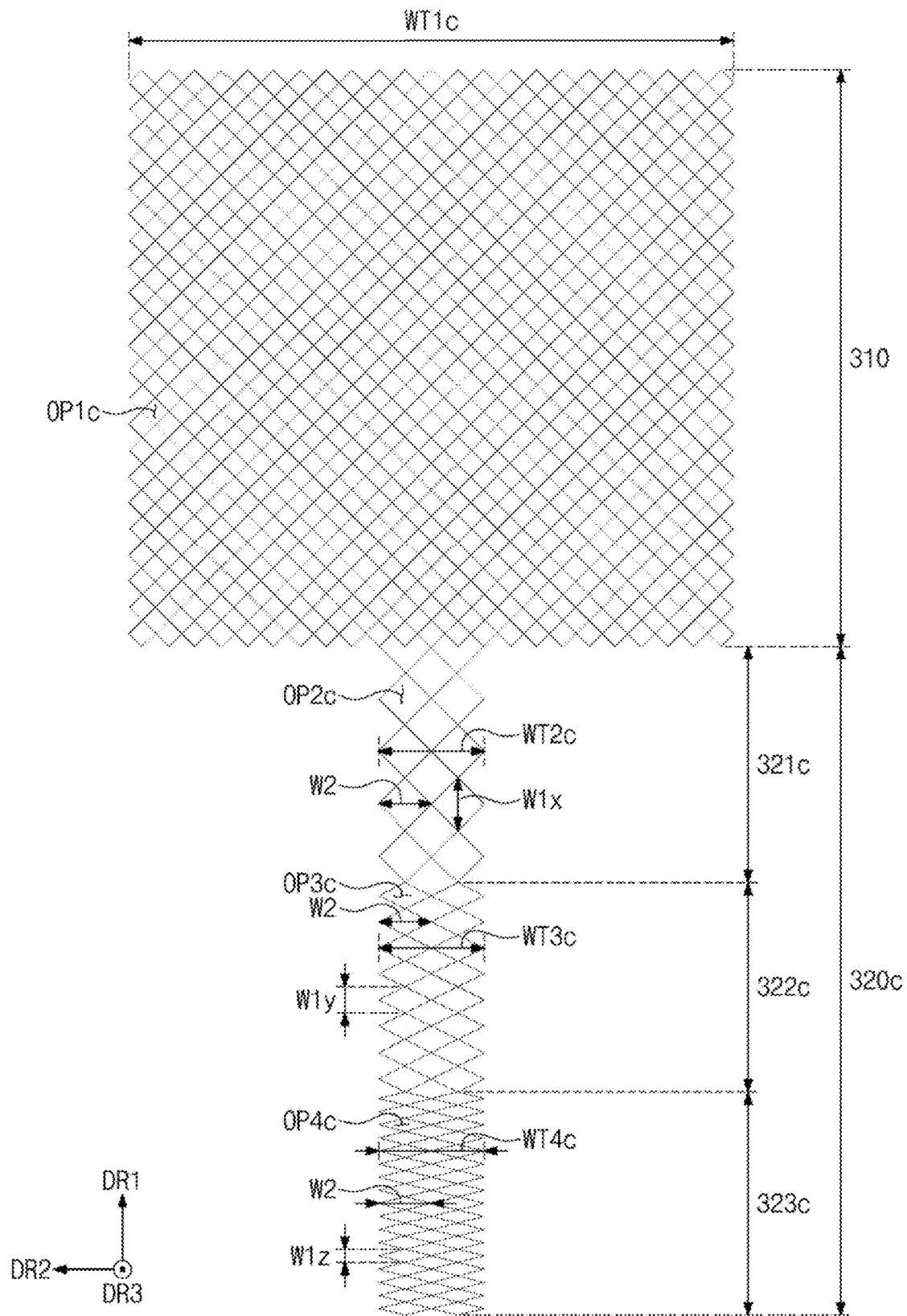
FIG. 21 is an enlarged plan view showing an antenna according to an embodiment of the present disclosure.

FIG. 21 is an enlarged plan view showing an antenna according to an embodiment of the present disclosure.

In FIG. 21, a radiation portion 310 and a connection portion 320c are enlarged and shown. The radiation portion 310 may be referred to as a "first pattern portion" 310. The connection portion 320c may include a second pattern portion 321c, a third pattern portion 322c, and a fourth pattern portion 323c. FIG. 21 shows a structure in which the connection portion 320c is divided into three pattern portions, however, the connection portion 320c may be divided into two pattern portions or may be divided into four or more pattern portions.

The first pattern portion 310, the second pattern portion 321c, the third pattern portion 322c, and the fourth pattern portion 323c may be sequentially arranged in the first direction DR1. The first pattern portion 310, the second pattern portion 321c, the third pattern portion 322c, and the fourth pattern portion 323c may be connected to each other to have an integral shape.

The first pattern portion 310 may have a first width WT1c, the second pattern portion 321c may have a second width WT2c, the third pattern portion 322c may have a third width WT3c, and the fourth pattern portion 323c may have a fourth width WT4c. The first width WT1c, the second width WT2c, the third width WT3c, and the fourth width WT4c may be widths in the second direction DR2 crossing the first direction DR1.

The first pattern portion 310 may correspond to the radiation portion that transmits, receives, or both transmits and receives the radio frequency signal and may have the first width WT1c that may be the largest width. Each of the second, third, and fourth widths WT2c, WT3c, and WT4c may be smaller than the first width WT1c. In addition, the second, third, and fourth widths WT2c, WT3c, and WT4c may be the same as each other.

A first opening OP1c with a first size may be defined in the first pattern portion 310, a second opening OP2c with a second size may be defined in the second pattern portion 321c, a third opening OP3c with a third size may be defined in the third pattern portion 322c, and a fourth opening OP4c with a fourth size may be defined in the fourth pattern portion 323c. The first, second, third, and fourth sizes of the first, second, third, and fourth openings OP1c, OP2c, OP3c, and OP4c may be different from each other. For example, according to the embodiment of the present disclosure, the characteristic impedances may be controlled by adjusting the size of the first, second, third, and fourth openings OP1c, OP2c, OP3c, and OP4c of the first, second, third, and fourth pattern portions 310, 321c, 322c, and 323c.

A length of a first diagonal line W1x of the second opening OP2c, a length of a first diagonal line W1y of the third opening OP3c, and a length of a first diagonal line W1z of the fourth opening OP4c may be different from each other. The first diagonal lines W1x, W1y, and W1z may be substantially parallel to the first direction DR1. The length of the first diagonal line W1x of the second opening OP2c may be greater than the length of the first diagonal line W1y of the third opening OP3c, and the length of the first diagonal line W1y of the third opening OP3c may be greater than the length of the first diagonal line W1z of the fourth opening OP4c.

Lengths of diagonal lines W2 of the second opening OP2c, the third opening OP3c, and the fourth opening OP4c, which are parallel to the second direction DR2, may be the same as each other. Accordingly, the number of the second openings OP2c arranged in the second direction DR2 in the second pattern portion 321c, the number of the third openings OP3c arranged in the second direction DR2 in the third pattern portion 322c, and the number of the fourth openings OP4c arranged in the second direction DR2 in the fourth pattern portion 323c may be the same as each other.

In FIGS. 12, 15, 18, and 21, each of the connection portions 320, 320a, 320b, and 320c are divided into the plural pattern portions, and the characteristic impedance is controlled by changing the mesh structure of the plural pattern portions, however, the present disclosure is not limited thereto or thereby. For example, each of the radiation portions 310 of FIGS. 12, 15, 18, and 21 may be divided into a plurality of radiation pattern portions, and the characteristic impedance of each of the radiation pattern portions may be adjusted by changing the mesh structure of the radiation pattern portions.

Although the embodiments of the present disclosure have been described, it is understood that the present disclosure is not limited to these embodiments but various changes and modifications can be made by one ordinary skilled in the art within the spirit and scope of the present disclosure as claimed. Therefore, the disclosed subject matter is not limited to any single embodiment described herein, and the scope of the present inventive concept shall be determined according to the claims.

What is claimed is:

1. An electronic apparatus comprising:
a display panel including an active area and a peripheral area; and
an antenna whose at least one portion overlaps the active area, the antenna comprising:
a first pattern portion having a first characteristic impedance and a first mesh structure;
a second pattern portion disposed adjacent to the first pattern portion and having a second characteristic impedance different from the first characteristic impedance and a second mesh structure; and
a third pattern portion disposed adjacent to the second pattern portion and having a third characteristic impedance and a third mesh structure, wherein the second characteristic impedance has a value between the first characteristic impedance and the third characteristic impedance,
wherein the first pattern portion, the second pattern portion, and the third pattern portion are sequentially arranged in a first direction, wherein a first width of the first pattern portion in a second direction crossing the first direction is greater than a second width of the second pattern portion in the second direction, wherein the first width of the first pattern portion is greater than a third width of the third pattern portion in the second direction, wherein a density of the first mesh structure is greater than a density of the second mesh structure, and wherein a density of the third mesh structure is greater than the density of the second mesh structure.

2. The electronic apparatus of claim 1, the antenna further comprising a fourth pattern portion disposed adjacent to the third pattern portion and having a fourth mesh structure with a density greater than the density of the third mesh structure.

3. The electronic apparatus of claim 1, wherein the first pattern portion is provided with a first opening having a first size, the second pattern portion is provided with a second opening having a second size, and the third pattern portion is provided with a third opening having a third size less than equal to the second size.

4. The electronic apparatus of claim 3, wherein a first number of the first openings arranged in the first pattern portion along the second direction is greater than a second number of the second openings arranged in the second pattern portion along the second direction, and a third number of the third openings arranged in the third pattern portion along the second direction is greater than the second number and smaller than the first number.

5. The electronic apparatus of claim 1, wherein the third width of the third pattern portion in the second direction is equal to the second width of the second pattern portion.

6. The electronic apparatus of claim 1, wherein the first pattern portion is provided with a first opening defined therethrough and having a first size, the second pattern portion is provided with a second opening defined therethrough and having a second size different from the first size, and the third pattern portion is provided with a third opening defined therethrough and having a third size different from the second size.

7. The electronic apparatus of claim 6, wherein a width of the second opening in the second direction, and a width of the third opening in the second direction are equal to each other.

8. The electronic apparatus of claim 7, wherein a width of the second opening in the first direction is greater than a width of the third opening in the first direction.

9. The electronic apparatus of claim 6, wherein a ratio of a width in the first direction to a width in the second direction of the first opening, a ratio of a width in the first direction to a width in the second direction of the second opening, and a ratio of a width in the first direction to a width in the second direction of the third opening are equal to each other.

10. The electronic apparatus of claim 9, wherein a number of the second openings arranged in the second pattern portion along the second direction is smaller than a number of the third openings arranged in the third pattern portion along the second direction.

11. The electronic apparatus of claim 6, wherein a number of the second openings arranged in the second pattern portion along the second direction is equal to a number of the third openings arranged in the third pattern portion along the second direction.

12. The electronic apparatus of claim 6, wherein a width of a line pattern of the second pattern portion is smaller than a width of a line pattern of the third pattern portion.

13. The electronic apparatus of claim 1, wherein the first pattern portion comprises a first line pattern that defines a first opening, the second pattern portion comprises a second line pattern that defines a second opening, the third pattern portion comprises a third line pattern that defines a third opening, and the first line pattern, the second line pattern, and the third line pattern have a same minimum width.

14. The electronic apparatus of claim 1, wherein the first pattern portion is a radiation portion that radiates a signal, and the first pattern portion overlaps the active area.

15. An electronic apparatus comprising:
a display panel including an active area and a peripheral area; and
an antenna overlapping the active area, the antenna comprising:
a first pattern portion having a first characteristic impedance and a first mesh structure;
a second pattern portion disposed adjacent to the first pattern portion and having a second characteristic impedance different from the first characteristic impedance and a second mesh structure; and
a third pattern portion disposed adjacent to the second pattern portion and having a third characteristic impedance and a third mesh structure, wherein the second characteristic impedance has a value between the first characteristic impedance and the third characteristic impedance,
wherein the first pattern portion, the second pattern portion, and the third pattern portion are sequentially arranged in a first direction, wherein the third pattern portion comprises an opening having a non-rectangular rhombus shape with a first diagonal line parallel to the first direction and a second diagonal line parallel to a second direction perpendicular to the first direction, and
wherein a ratio of the first diagonal line and the second diagonal line of the second pattern portion and a ratio of the first diagonal line and the second diagonal line of the third pattern portion are different from each other.

16. The electronic apparatus of claim 1, further comprising an input sensor disposed between the display panel and the antenna and provided with a sensing area having a size equal to or smaller than a size of the active area.

17. The electronic apparatus of claim 1, further comprising an input sensor disposed on the display panel and comprising a base insulating layer and a sensing electrode disposed on the base insulating layer, wherein the first pattern portion, the second pattern portion, and the third pattern portion are disposed on a same layer as the sensing electrode.

18. The electronic apparatus of claim 17, wherein the input sensor comprises:
a sensing area in which the sensing electrode is disposed; and
an antenna area in which the first pattern portion, the second pattern portion, and the third pattern portion are disposed, and wherein the sensing area and the antenna area overlap the active area.

19. The electronic apparatus of claim 18, wherein the input sensor further comprises a dummy electrode disposed on the base insulating layer, wherein the dummy electrode is disposed adjacent to the antenna area and overlaps the active area.

20. The electronic apparatus of claim 19, wherein the input sensor further comprises a dummy area in which the dummy electrode is disposed, and the antenna area, the sensing area, and the dummy area overlap the active area.

21. The electronic apparatus of claim 18, wherein the sensing electrode comprises a sensing pattern based on a shape of the first pattern portion.

22. A radio frequency device comprising:
a base layer;
a first pattern portion disposed on the base layer, having a first characteristic impedance and a first mesh structure, and provided with a first opening;
a second pattern portion disposed on the base layer adjacent to the first pattern portion, having a second characteristic impedance different from the first characteristic impedance and a second mesh structure, and provided with a second opening; and
a third pattern portion disposed on the base layer, disposed adjacent to the second pattern portion, having a third characteristic impedance and a third mesh structure, and provided with a third opening, wherein the second characteristic impedance has a value between the first characteristic impedance and the third characteristic impedance, and
wherein a width of the first pattern portion is the largest among widths of the first, second, and third pattern portions, and the first characteristic impedance is the largest among the first, second, and third characteristic impedances,
wherein a width of the third pattern portion is equal to a width of the second pattern portion, and
wherein a shape of the second mesh structure is different from a shape of the third mesh structure.

23. The radio frequency device of claim 22, wherein a first size of the first opening, a second size of the second opening, and a third size of the third opening are equal to each other.

24. The radio frequency device of claim 22, wherein a first size of the first opening is different from a second size of the second opening, and a third size of the third opening is different from the second size.

25. The radio frequency device of claim 22, wherein a width of a line pattern of the first pattern portion, a width of a line pattern of the second pattern portion, and a width of a line pattern of the third pattern portion are equal to each other.

26. The radio frequency device of claim 22, wherein a width of a line pattern of the second pattern portion is smaller than a width of a line pattern of the third pattern portion.

27. The radio frequency device of claim 22, wherein the first pattern portion, the second pattern portion, and the third pattern portion are sequentially arranged in a first direction, a first width of the first pattern portion in a second direction crossing the first direction is greater than a second width of the second pattern portion in the second direction.

28. The radio frequency device of claim 22, wherein the first pattern portion, the second pattern portion, and the third pattern portion are sequentially arranged in a first direction, a first width of the first pattern portion in a second direction crossing the first direction is greater than a second width of the second pattern portion in the second direction, and a third width of the third pattern portion in the second direction is equal to the second width.

* * * * *